United States Patent
Riedl et al.

(10) Patent No.: US 12,432,406 B2
(45) Date of Patent: Sep. 30, 2025

(54) METHODS AND SYSTEMS FOR STREAMING VIDEO ANALYSIS

(71) Applicant: Pluto Inc., West Hollywood, CA (US)

(72) Inventors: Steven Ernest Riedl, Atlanta, GA (US); Upendra Mohan Sharma, West Hollywood, CA (US); Terrence Mullane, Jr., Seattle, WA (US); Kevin Liu, Culver City, CA (US); Mahavir Chowbay Baboolall, West Hollywood, CA (US)

(73) Assignee: Pluto Inc., West Hollywood, CA (US)

( * ) Notice: Subject to any disclaimer, the term of this patent is extended or adjusted under 35 U.S.C. 154(b) by 71 days.

(21) Appl. No.: 18/428,370

(22) Filed: Jan. 31, 2024

(65) Prior Publication Data
US 2025/0247576 A1    Jul. 31, 2025

(51) Int. Cl.
| | |
|---|---|
| *H04N 21/266* | (2011.01) |
| *G06V 30/19* | (2022.01) |
| *G10L 15/00* | (2013.01) |
| *G10L 25/57* | (2013.01) |
| *H04N 21/233* | (2011.01) |
| *H04N 21/234* | (2011.01) |

(52) U.S. Cl.
CPC ........... *H04N 21/266* (2013.01); *G06V 30/19* (2022.01); *G10L 15/005* (2013.01); *G10L 25/57* (2013.01); *H04N 21/233* (2013.01); *H04N 21/23418* (2013.01)

(58) Field of Classification Search
None
See application file for complete search history.

(56) References Cited

U.S. PATENT DOCUMENTS

| | | | |
|---|---|---|---|
| 6,137,834 A * | 10/2000 | Wine | H04N 19/179 375/240 |
| 9,258,589 B2 | 2/2016 | Grouf et al. | |
| 9,699,515 B2 | 7/2017 | Grouf et al. | |
| 9,712,884 B2 | 7/2017 | Grouf et al. | |
| 9,998,787 B2 | 6/2018 | Grouf et al. | |
| 10,231,018 B2 | 3/2019 | Grouf et al. | |
| 10,327,037 B2 | 6/2019 | Shanson et al. | |
| 10,356,447 B2 | 7/2019 | Shanson | |
| 10,356,480 B2 | 7/2019 | Hou et al. | |
| 10,560,746 B2 | 2/2020 | Grouf et al. | |
| 10,715,848 B2 | 7/2020 | Hou | |
| 10,931,990 B2 | 2/2021 | Hou | |

(Continued)

*Primary Examiner* — James R Marandi
(74) *Attorney, Agent, or Firm* — Knobbe, Martens, Olson & Bear LLP

(57) ABSTRACT

An aspect of the disclosure is related to methods and systems configured to detect an item of ancillary video content, the item of ancillary video content comprising video frames and an audio track. A first portion of the item of ancillary video content comprising video frames and an audio track. A presence of a first feature in a video frame and/or a second feature within the audio track are detected within the first portion of the item of ancillary video content, wherein the first feature and/or the second features are indicative of a joining of two separate items of ancillary content. At least partly in response to detecting the presence of the first feature in the video frame and/or the second feature, streaming of the first item of ancillary video content to one or more client devices is inhibited.

33 Claims, 8 Drawing Sheets

(56) References Cited

U.S. PATENT DOCUMENTS

| | | |
|---|---|---|
| 10,939,168 B2 | 3/2021 | Grouf et al. |
| 11,178,433 B2 | 11/2021 | Hou |
| 11,265,604 B2 | 3/2022 | Grouf et al. |
| 11,395,038 B2 | 7/2022 | Grouf et al. |
| 11,425,437 B2 | 8/2022 | Hou |
| 11,463,741 B2 | 10/2022 | Hou |
| 11,509,946 B1 | 11/2022 | Liu et al. |
| 11,533,527 B2 | 12/2022 | Shanson et al. |
| 11,627,375 B2 | 4/2023 | Grouf et al. |
| 11,659,244 B2 | 5/2023 | Grouf et al. |
| 11,659,245 B2 | 5/2023 | Grouf et al. |
| 11,729,434 B2 | 8/2023 | Hou |
| 11,729,439 B2 | 8/2023 | Liu et al. |
| 11,849,165 B2 | 12/2023 | Shanson et al. |
| 2011/0307545 A1 | 12/2011 | Bouazizi |
| 2014/0025836 A1* | 1/2014 | Gupta .............. H04N 21/23424 709/231 |
| 2019/0095076 A1 | 3/2019 | Takehara et al. |
| 2020/0204847 A1* | 6/2020 | Lykes ................ H04N 21/8455 |
| 2021/0014550 A1 | 1/2021 | Pantos |
| 2021/0263945 A1 | 8/2021 | Siebel et al. |
| 2021/0314665 A1 | 10/2021 | Davenport et al. |
| 2021/0337254 A1* | 10/2021 | Lykes ................ G06Q 30/0241 |
| 2021/0392393 A1* | 12/2021 | Olsson ............. H04N 21/23424 |
| 2023/0078252 A1 | 3/2023 | Lucca |
| 2023/0254537 A1 | 8/2023 | Grouf et al. |
| 2024/0022771 A1 | 1/2024 | Hou |
| 2024/0056627 A1 | 2/2024 | Riedl et al. |

* cited by examiner

METHODS AND SYSTEMS FOR STREAMING VIDEO ANALYSIS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present invention is related to video streaming over a network.

Description of the Related Art

Items of video content from multiple sources may be routed over a network, such as the Internet, to a video player on a client device. The video content may be routed from a plurality of sources.

Figure 1:
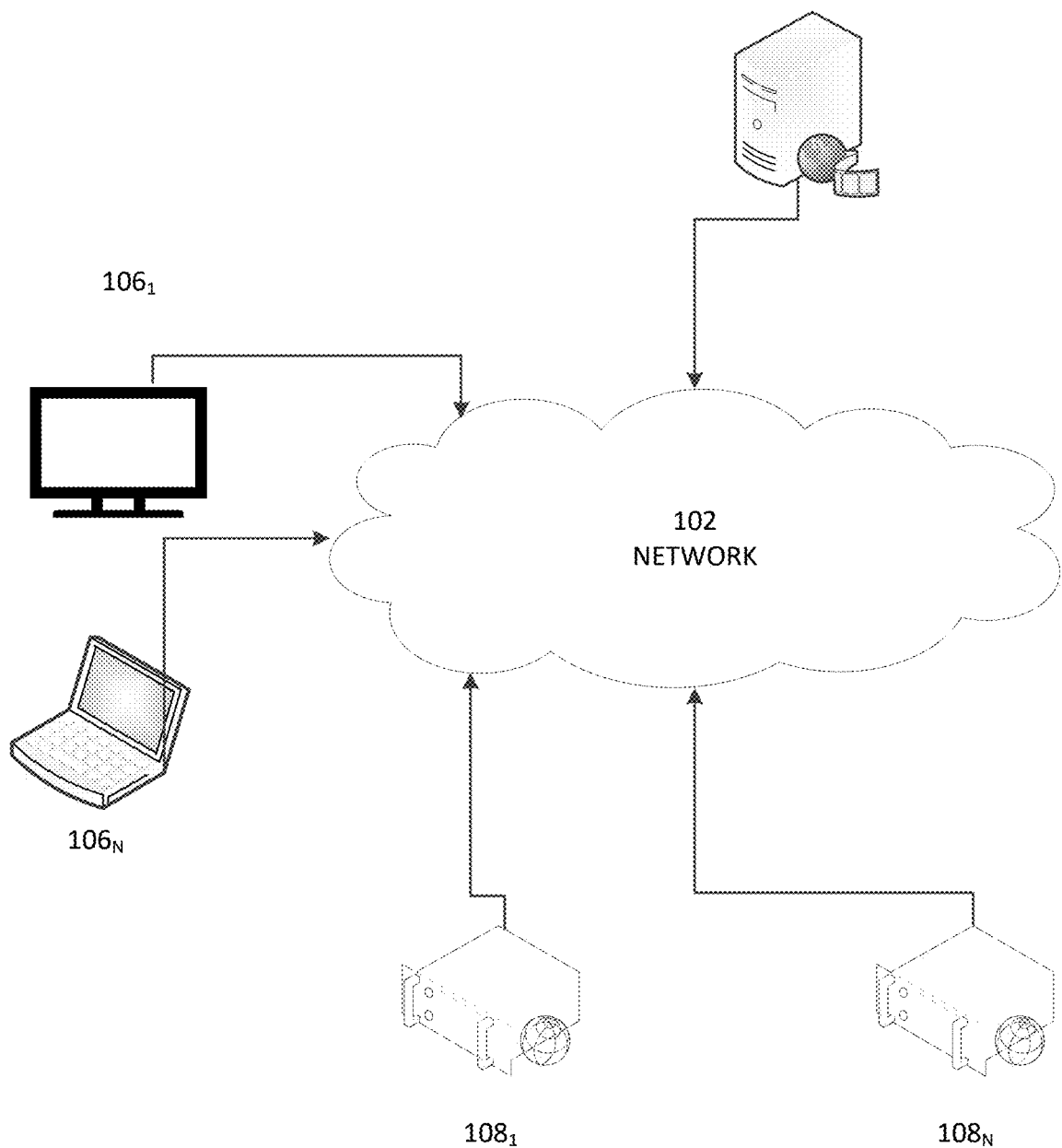
FIG. 1 illustrates an example environment.

While each of the drawing figures illustrates a particular aspect for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments.

DETAILED DESCRIPTION

An aspect of the present disclosure relates to methods and systems configured to analyze streaming video frames and/or associated audio being transmitted over a network, such as the Internet, to client devices, and based on such analysis, determine how and if certain data is to be routed. Such content may include ancillary content to be displayed in conjunction on-demand content and/or real time content (e.g., real time sporting events, news, concerts, and/or the like). An aspect of the present disclosure inhibits the presentation of certain content, such as ancillary content (e.g., ad content, quizzes, public service announcements, station identification, etc.) based on features identified in the ancillary content and the primary streaming content (e.g., a movie, show, sporting event, or the like).

An aspect of the present disclosure relates to detecting when two or more items of ancillary content have been joined together (e.g., digitally spliced together) and transmitted as a single item of ancillary content. For example, a fraudster may cause the two ads to be joined together and streamed as a single item of ancillary (e.g., ad) content. The fraudster may do this in order to charge two different advertisers for the placement of two ads, while only paying the publisher (e.g., a streaming service) for playing a single ad.

For example, disadvantageously, even though two ads may be streamed to streaming service user devices, only a single ad beacon may be fired (as it appears to be only one ad) rather than two ad beacons (one for each ad). This may have a detrimental effect on the tracking and analysis of user interactions with ads, as well as with respect to the correct charging for the ads. Ad beacons (which may sometimes be referred to as pixel tags, tracking pixels, or web beacons), are typically small, transparent graphics embedded in web pages, emails, or advertisements. Such beacons may be used to collect information about user behavior and interactions with online content, such as ads. Advertisers may use ad beacons to gather data that may be useful for assessing the effectiveness of advertising campaigns and optimizing ad strategies. Ad beacons may be used in the context of charging advertisers as follows. Therefore, the failure to appropriately trigger beacons may have an adverse impact on data gathering, analysis, and charging for placement.

Advertisers are often charged based on the number of ad impressions, (the number of times their ad is displayed to users). Ad beacons may track when an ad is loaded (e.g., on a webpage), enabling advertisers to measure the reach of their campaigns and to be accordingly charged. Some advertising models charge advertisers for each user who clicks on their ad. Ad beacons are used to track user clicks on the ad, providing advertisers with data on engagement and enabling advertisers to be charged based at least in part on the number of clicks on the ad. Further, advertisers are interested in understanding how effective their ads are at driving specific actions, such as making a purchase or filling out a form (sometimes referred to as a conversion). Ad beacons may be used to track conversions by recording when a user completes a desired action after interacting with the ad. The advertiser may then be charged a corresponding fee for such conversion. Ad beacons may also enable user actions to be attributed to specific ad exposures, allowing advertisers to allocate credit to the right advertising channels. If only one ad beacon is fired for the two joined ads, only a portion of the fees may be collected, improper attribution may occur, and advertiser analytics may provide erroneous analysis.

Another technical problem introduced by the joining of two items of ancillary content is that they may be provided at respective different bitrates. Such different bitrates may cause a transcoding process being executed by a streaming service to crash, thereby interrupting the streaming process for at least a period of time.

A human review of ancillary content is not possible as a practical matter and cannot be performed in real time, as an ad-supported streaming service may have tens of billions of impressions a month.

In order to remediate the technical problems introduced by the joining of two or more items of ancillary content as a single item of ancillary content, when such joined ancillary content is detected, the current and/or future transmission of such ancillary content may be blocked from being transmitted to one or more (or all) client devices receiving streamed content from a streaming service system. The system may communicate a detection of multiple joined items of ancillary content and/or the detection of multiple brands (e.g., multiple brand names, logos, etc.) in an item of ancillary content to an advertiser and/or a demand-side platform that served the ad, and may prohibit the ad from being served again (e.g., for violating terms of service).

Certain types of ancillary content (e.g., advertisements) may have a common time length of 15 seconds or 30 seconds. Hence, there may be certain characteristics (e.g., a dark or black screen, a drop out in sound) in the video or audio track at the beginning or end of an individual item of ancillary content, and hence at a point of joining of two individual items of ancillary content, that may indicate that two items of ancillary content have been joined together (e.g., at midway point, such as at 15 seconds plus and/or minus a time width, such as a time width or window of 1-4 seconds, where the time width is no more that 25% of the entire width of the ancillary content). Hence, detection of such characteristics at certain time locations within the ancillary content (e.g., at about the midway point) may indicate the joining of two or more items of ancillary content.

For example, the audio track may be monitored using an audio analysis engine and a sudden change in volume (e.g., changes in average volume, peak volume, and/or the like) or silence (e.g., a volume less than a threshold loudness level, which may be specified in decibels) during a selected portion of the audio track (e.g., about the middle of the audio track for at least a first amount of time) may be detected (which may indicate a change from one item of ancillary content to another item of ancillary content).

Therefore, optionally, to enhance accuracy and reduce computer resource utilization, the audio analysis may be limited to a portion of the ancillary content. For example, the audio analysis may be limited to a limited period before and/or after the midpoint of the ancillary content (e.g., 1-5 seconds before and/or after the midpoint, as well as the midpoint).

By way of further example, certain visual characteristics (e.g., a black period or more than a threshold difference in brightness) may be detected in one or more selected portions of the video (e.g., about the middle of the video) which may indicate a change from one item of ancillary content to another item of ancillary content. Therefore, optionally, to enhance accuracy and reduce computer resource utilization, the image analysis may be limited to a portion of the ancillary content. For example, the image analysis of video frames may be limited to a limited period before and/or after the midpoint of the ancillary content (e.g., 1-5 seconds before and/or after the midpoint, as well as the midpoint).

By way of yet further example, text may be detected in frames of an item of video content. Often, the largest text (e.g., in height dimensions and/or font size) in a video may correspond to a brand identifier (e.g., a brand name, logo, etc.). The largest text may be identified in a first portion of the item of video content (e.g., the first half of the video content) and the largest text may be identified in a second portion of the item of video content (e.g., the second half of the video content). The largest text identified in the first portion of the item of video content may then be compared with the largest text identified in the second portion of the item of video content. If the largest text in the first portion of the item of video content is determined to be different than the largest text identified in the second portion of the item of video content, a determination may be made that the first portion is related to a first brand and that the second portion is related to a second brand. Optionally, the largest text in the first portion of the item of video content may be compared to a datastore of brand identifiers (e.g., brand name, logo, and/or design), and similarly, the largest text in the second portion of the item of video content may be compared to a datastore of brand names/identifiers. If the different portions are determined to include different brand identifiers, a determination may be made that two different items of ancillary content (e.g., ads) may have been joined together. Optionally, if the largest text in a given portion does not match a brand identifier in the datastore of brand names/identifiers, the next largest text in the given portion can be compared to those in the datastore of brand names/identifiers, and so on, until a match is found (which may then be flagged as a brand identifier)

Text recognition in an item of ancillary video content may be performed using optical character recognition (OCR). Before performing OCR on videos, the video frames may be preprocessed to enhance the quality of the text to improve OCR processing. Such preprocessing may comprise image stabilization, noise reduction, and/or contrast adjustment. The ancillary video content may be decomposed into individual frames to process respective frames separately. An OCR algorithm may be utilized to analyze respective frames to recognize and extract text. The OCR algorithm may optionally use feature extraction, pattern matching, and/or language modeling to recognize text. Optionally, deep learning-based OCR models, such as convolutional neural networks (CNNs) or recurrent neural networks (RNNs), or other neural network may be utilized to recognize text. For deep learning-based OCR, the model may be trained on a dataset that includes video frames with labeled text to improve accuracy. Training enables the model to learn specific characteristics of the text it will encounter.

In particular, with respect to a CNN model, the CNN model may include an input layer, one or more convolutional layers, an activation layer, and one or more pooling layers. A frame or a portion of a frame (comprising an image) that may contain characters (e.g., a brand identifier) may be input into the CNN model. The convolutional layers use convolutional operations to scan the input image with filters or kernels. The filters are configured to detect low-level features such as edges, corners, and/or textures in the image.

After a given convolutional operation, an activation function (e.g., ReLU—Rectified Linear Unit) may be applied element-wise to introduce non-linearity and capture complex patterns in the data. One or more pooling layers may be used to downsample the spatial dimensions of the feature maps obtained from the convolutional layers. For example, max pooling may be utilized to retain the more or most significant information in a local region.

Optionally, after one or more convolutional and pooling layers, the feature maps are flattened into a one-dimensional vector. This vector may be input to the subsequent fully connected layers. The fully connected layers may be used to process the flattened vector and learn high-level representations. These layers enable the network to understand the relationships between different features across the entire image. For text recognition, fully connected layers may be utilized to capture the complex structures and dependencies within the text. The output layer may have as many neurons as there are classes or categories and may generate raw scores. In the case of text recognition, a given neuron may correspond to a different character or symbol. A softmax activation function may be applied to the output layer to convert the raw scores into probability distributions, indicating the likelihood of each class. The class with the highest probability may be selected as the predicted class for the input.

The CNN model may be trained using a loss function that measures the difference between the predicted probabilities and the actual labels. For text recognition, categorical cross-entropy may be utilized. The CNN may be trained on a labeled dataset of images containing text. During training, the model may adjust its weights to minimize the chosen loss function. Backpropagation may be used to propagate the error backward through the network and update the weights accordingly. This process is repeated iteratively during training until the difference between the predicted probabilities and the actual labels is sufficiently small.

Optionally, various determinations (regarding the possibility that two or more items of ancillary content have been joined together as a single item of ancillary content) based on the characteristics discussed herein may be assigned different weights relating to the reliability or accuracy of such determinations. The weighted determinations may be aggregated (e.g., combined via a mathematical formula) into an ensemble score indicating the likelihood that the item of ancillary content actually includes two (or more) items of ancillary content. The ensemble score may be compared to a threshold, and if the ensemble score satisfies the threshold (e.g., is greater or equal to the threshold) the item of ancillary content may be flagged as including two (or more) items of ancillary content. If the ancillary content is so flagged, the current and/or future transmission of such ancillary content may be blocked from being transmitted to one or more (or all) client devices receiving streamed content from a streaming service system. For example, where the ancillary content is an ad, a signaling message may be transmitted to an ad decisioning service to reject the corresponding ad campaign and/or advertiser to thereby prevent or inhibit the transmission of such ancillary content containing multiple joined items of ancillary content.

By way of illustration, a given item of content (e.g., an ad or other ancillary content) may be passed through a plurality of classifiers. The output of a given classifier (where a given classifier may use a corresponding determination technique described herein) may be weighted (e.g., where the output is multiplied by a weighting factor), where different classifiers may be assigned different weights. The weights may be assigned based on the relative importance and/or reliability. The weights may be generated and periodically adjusted using a learning engine. The weighted outputs may be summed and compared against a threshold associated with an issue that is to be prevented (e.g., the prevention of streaming of ancillary content that contains two or more separate ads). If the threshold is met, corrective action may be taken such as the prevention or future prevention of streaming of the ancillary content (e.g., a signaling message may be transmitted to an ad decisioning service to reject the corresponding ad campaign and/or advertiser).

The classifiers may be implemented as a classifier pipeline. The pipeline may be triggered in response to a new item of content (e.g., ancillary content) being returned from a decisioning process that selected the new item of content. The decisioning process may comprise an ad selection process, wherein an ad is served based on the advertiser's campaign criteria (targeting, placement, bidding strategy, etc.).

An additional aspect of the present disclosure relates to detecting when duplicate items of video content (e.g., ancillary content) are stored in a media content data store from which video content is to be streamed to client devices. Disadvantageously, such storage of duplicate video content wastes an inordinate amount of storage memory. Further, disadvantageously, the presence of such duplicate video content may inadvertently result in the same video content (e.g., ancillary content) inadvertently being presented multiple times to a given user. Such repeated presentation of video content may result in a poor user experience and may result in the user switching to different streaming content (e.g., a different program or channel).

To overcome this technical challenge, technical solutions are described to detect duplicate items of video content (e.g., ancillary content). For example, a fingerprint of a given video may be generated and compared to other video fingerprints of video content stored in memory. If a matching fingerprint is detected, one of the copies of the item of video content may be deleted to thereby reduce memory utilization and to prevent or reduce the possibility that the item of video content will be inadvertently transmitted multiple times to a given user device.

For example, a video fingerprint may be generated using a feature extraction technique to capture relevant information from video frames. The extracted features may include one or more of color histograms, key frames, and/or other visual descriptors. The fingerprint may also comprise video length. Optionally, audio features of the video audio track may be extracted and used to generate the fingerprint. For example, Mel-frequency cepstral coefficients (MFCCs) or spectrogram representations, rhythm features (e.g., beat information), chroma features representing pitch information, and/or statistical features (e.g., mean, variance, etc.), may be utilized in generating an audio fingerprint.

A hashing algorithm or encoding method may be utilized to convert the extracted features into a compact representation, thereby reducing memory consumption and enabling the system to quickly perform fingerprint comparisons and to detect matches.

Optionally, the fingerprint may be made robust to common video transformations such as resizing, cropping, and/or compression. This helps ensure that the fingerprint remains effective even if the video undergoes minor alterations. For example, features that are invariant or less sensitive to certain transformations (e.g., resizing or cropping) may be extracted, such as color histograms and/or texture features, as opposed to pixel values (which are more sensitive to such transformations). By way of further example, scale-invariant techniques may be utilized to handle resizing, wherein the scale of the video frames may be normalized. Optionally, checks for spatial and temporal consistency in the video may be performed, wherein the relationship between adjacent frames is analyzed to detect spatial transformations (e.g., cropping) and temporal transformations (e.g., frame rearrangement). Optionally, error-correcting codes may be utilized to handle variations in the video content.

The video fingerprints may be stored in a database along with related metadata such as video ID, duration, and/or other identifying information, for use in the fingerprint comparison operation discussed herein.

Another aspect of the present disclosure relates to determining if there is a mismatch between the language in ancillary content about to be streamed or that had been streamed to one or more client devices and the language of primary video content (e.g., where the ancillary content is to be played between portions of the primary content). For example, if the primary content audio track language is in English and if the ancillary content audio track is in Korean, that would be termed a language mismatch. Such mismatches may result in a poor user experience and may result in the user switching to different streaming content, which will incur a significant consumption in computer resources (e.g., which would be needed to assemble a new manifest and may necessitate additional stitcher operations). Thus, an aspect of the present disclosure relates to detecting language mismatches between primary content and ancillary content and taking corrective action. For example, the ancillary content may be blocked from being streamed in association with the primary content upon initial detection of such mismatch and/or in the future. This overcomes the technical problem of failing to adequately determine an appropriate ancillary content language for a given item of primary content.

A language mismatch may optionally be detected by comparing metadata, indicating the language of the item of primary content, with metadata indicating the language of the item of ancillary content. If the language metadata of the primary content does not match the metadata of the ancillary content, a language mismatch may be flagged. Optionally, a language recognition algorithm may be utilized to analyze the audio tracks of the ancillary content and/or the primary content. The algorithm may assign a code to the language (e.g., an ISO 639 code). The ISO (International Standards Organization) 639 language code for the primary content may be compared to the ISO code from the ancillary content. If the ISO codes match, a determination may be made that there is no language mismatch. If the ISO codes do not match, a determination may be made that there is a language mismatch.

Optionally, Natural Language Processing (NLP) may be used to perform language identification by analyzing the audio tracks of the primary and ancillary content. For example, acoustic analysis may be performed analyzing acoustic features of speech signals to determine the language being spoken. Different languages exhibit distinct acoustic characteristics, such as phoneme patterns, intonation, and rhythm.

Mel-Frequency Cepstral Coefficients (MFCCs) and/or spectrogram analysis may be utilized to extract relevant features from the audio signal. Phonetic analysis may be performed to analyze phonetic patterns of the audio tracks. Languages have unique phonetic patterns, and the phonetic analysis may determine which language corresponds to the detected phonetic pattern.

A statistical language model and/or machine learning model, trained on large corpora of text in different languages, may be utilized to perform language identification. Such models may be utilized to analyze the linguistic features of the transcribed content and predict the most likely language. Keyword spotting may be performed to identify the audio track language, wherein specific words or phrases that are language-specific can be used as cues for language identification. Deep learning models, such as neural networks (e.g., Convolutional Neural Networks (CNNs) or Recurrent Neural Networks (RNNs) comprising an input layer, one or more hidden layers, one or more pooling layers, an output layer, and an activation function), trained on spectrogram data or other representations of audio signals for language identification, may be utilized to identify the language used in an audio track of primary and/or ancillary content. Optionally, multiple techniques (e.g., acoustic analysis, phonetic analysis, and/or language models) may be utilized to identify the language used in an audio track. Combining multiple techniques may provide more accurate language identification, as the strengths of each approach may compensate for individual limitations.

Another aspect of the present disclosure relates to determining that the wrong metadata (e.g., closed captioning in a particular language) is being or is about to be streamed to one or more client devices is association with video content (e.g., ancillary content which may be configured to be played between segments of primary content or primary content programs/movies). Closed captioning may comprise text that is delivered in sync with streaming video to a client device. Optionally, closed captioning may be toggled on or off. Closed captioning may provide text equivalent content to the audio content in the program. Closed captioning may include unspoken audio elements such as a description of music being played, a description of clapping, footsteps, or a door being slammed closed, since these audible sounds may be a significant component of the intended viewing experience. Such mismatches may result in a poor user experience and may result in the user switching to different streaming content, which will incur a significant consumption in computer resources (e.g., which would be needed to assemble a new manifest and may necessitate additional stitcher operations). Thus, an aspect of the present disclosure relates to detecting closed captioning language mismatches and correcting such mismatches (e.g., by selecting the correct closed captioning text). This overcomes the technical problem of failing to adequately determine and select an appropriate language for a given user and/or region.

Natural Language Processing (NLP) and/or Deep learning models may be used to perform language identification by analyzing the audio tracks of the ancillary content and the closed captioning as similarly discussed elsewhere herein with respect to language identification. If a mismatch is detected, a corrective action may be performed, such as selecting the correct closed language and causing the correct closed language to be transmitted to the user device in conjunction with the ancillary video and audio content. By way of further example, the transmission of the item of video content may be inhibited from being transmitted to one or more client devices with the incorrect closed language.

In order to detect such a mismatch, optionally, an ISO 639 language code associated with the language of the audio track may be compared to ISO language codes of available subtitles. If there is a mismatch, the subtitle with the ISO language code that matches the audio track ISO language code may be selected and provided to the user device in conjunction with the corresponding ancillary content video (including the ancillary content audio track) for playback by the user device. Optionally, the language mismatch may be detected after the item of ancillary content has been served with respect to the item of primary content, and the detection of the language mismatch may be transmitted in a message to the advertiser and/or a demand-side platform that served or caused the ancillary content to be served, so that the ancillary content will not be served again in association with the item primary content.

In another aspect of the present disclosure, optionally, if a scene in primary content video immediately before or after an ancillary content break/ad pod includes a source identifier (e.g., a brand name, logo, design, etc. That signifies source), detected as described elsewhere herein, a determination may be made as whether a given item of ancillary content selected to be potentially inserted into that break/pod includes a source identifier of a competing source (e.g., corresponding to a product or service from a compete company). If a conflict is detected (e.g., the ancillary content includes a different source identifier than the primary content scene) the ancillary content may be rejected for use in the break/pod. The source identifiers may be identified using techniques described elsewhere herein.

Technical solutions that overcome some or all of the technical problems and challenges described herein will now be described with reference to the figures.

FIG. 1 illustrates an example environment. A content composer system 104 (which may include a stitcher component, such as a server, providing stitcher services or where a stitcher system may include a content composer component, or where the content composer and the stitcher may be independent systems) is connected to a network 102. The content composer system 104 is configured to communicate with client devices $106_1 \ldots 106_n$ (e.g., associated with users of a streaming service) that comprise video players. By way of example, the video player may be embedded in a webpage, may be a dedicated video player application, or may be part of a larger app (e.g., a game application, a word processing application, etc.). The video player may be configured to play video and/or audio content, including primary content and ancillary content. For example, the content composer system 104 may receive a request for media from a given client device 106 in the form of a request for a playlist manifest or updates to a playlist manifest.

The content composer system 104 may identify, from a file, the location and length of an ancillary content pod, such as an interstitial pod (a time frame reserved for ancillary content, such as interstitials, wherein one or more interstitials may be needed to fill a pod, wherein an item of ancillary content may be in the form of interstitial content), determine context information (e.g., information regarding the primary content being requested, information regarding the user, and/or other context information), solicit and select interstitial content from third parties, define customized interstitials as described herein, generate playlist manifests, and/or perform other functions described herein. The content composer system 104 and/or another system may stream requested content to the requesting device 106.

Optionally, the content composer system 104 may transmit context information to one or more interstitial source systems $108_1 \ldots 108_n$. For example, the source systems $108_1 \ldots 108_n$ may optionally include ad servers, and the interstitial content may comprise ads. The interstitial source systems $108_1 \ldots 108_n$ may comply with the VAST protocol. By way of further example, the interstitial source systems $108_1 \ldots 108_n$ may provide public service videos, previews of upcoming programs, quizzes, news, games, and/or other content. The interstitial source systems $108_1 \ldots 108_n$ may use the context information in determining what interstitial content is to be provided or offered to the requesting client device 106. Optionally, as part of a decisioning process, the interstitial source systems $108_1 \ldots 108_n$ may submit bids to place interstitial content in association with primary content, and the content composer system 104 may evaluate the bids and optionally based at least in part on the bids, select one or more items to insert into an interstitial pod. The interstitial source systems $108_1 \ldots 108_n$ may be configured to receive signaling to reject the corresponding ad campaign and/or advertiser from the content composer system 104 indicating that a particular item of ancillary content, such as interstitial content, is not to be transmitted to client devices $106_1 \ldots 106_n$ as similarly discussed elsewhere herein.

As described elsewhere herein, the content composer system 104 may be configured to detect certain video and/or audio characteristics in ancillary content that indicates that two or more separate items of ancillary content (e.g., two or more separate ads) have been joined (e.g., digitally spliced together), and transmitted as a single item of ancillary content. when multiple content features of a given type are in a video frame. For example, as similarly discussed elsewhere herein, the content composer system 104 may be configured to detect visual characteristics (e.g., a black period or more than a threshold difference in brightness) in one or more selected portions of the video (e.g., a middle portion 1-10 seconds long) which may indicate a change from one item of ancillary content to another item of ancillary content. By way of further example, as similarly discussed elsewhere herein, the content composer system 104 may be configured to detect when there are identifiers (e.g. brand names, brand logos, brand designs) of multiple brands in an item of ancillary content using OCR, neural networks, and/or other techniques. Optionally, a confidence score may be generated indicating the confidence/reliability that the detection of two more identifiers is accurate.

Further, in response to detecting there are identifiers of multiple brands are in an item of ancillary content (e.g., interstitial content), the content composer system 104 may take one or more actions (e.g., in response to the confidence score exceeding a first threshold). Optionally, the ancillary content may be transmitted (e.g., as an ancillary content file or a link to the ancillary content file) to one or more destinations (e.g., via an email, short messaging service, application notification, or otherwise) to further review (e.g., via human review) the ancillary content to verify whether or not the ancillary content actually includes multiple brands. Optionally, the content composer system 104 may transmit a notification regarding the detection to a source of the ancillary/interstitial content and/or may inhibit the streaming of the ancillary/interstitial content. Where the ancillary/interstitial content is an ad, a signaling message may be transmitted to an ad decisioning service to reject the corresponding ad campaign and/or advertiser to thereby prevent or inhibit the transmission of such ancillary/interstitial content containing multiple joined items of ancillary/interstitial content.

Figure 2A:
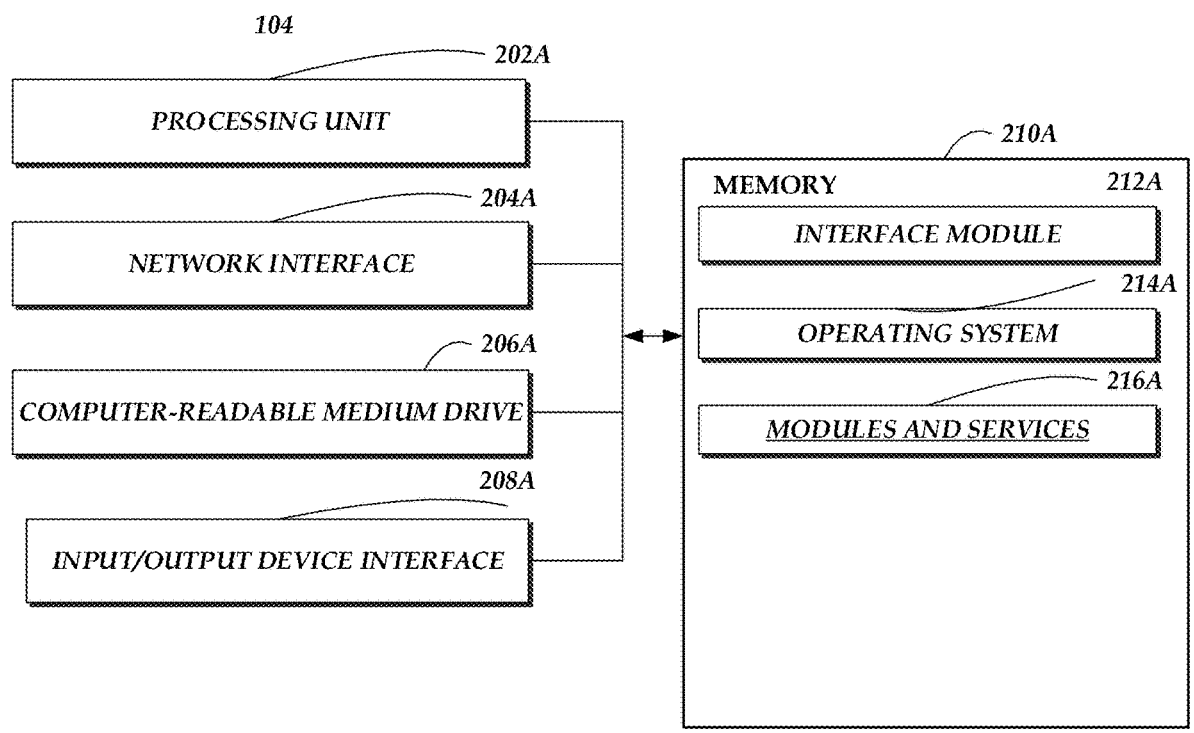
FIG. 2A is a block diagram illustrating example components.

FIG. 2A is a block diagram illustrating example components of a content composer system 104. The example content composer system 104 includes an arrangement of computer hardware and software components that may be used to implement aspects of the present disclosure. Those skilled in the art will appreciate that the example components may include more (or fewer) components than those depicted in FIG. 2A.

The content composer system 104 may include one or more processing units 202A (e.g., a general purpose processor or artificial intelligence processor (e.g., comprising one or more arithmetic logic units, data registers, an encryption processor, a video transcoder, input/output busses, and/or a high speed graphics processor), one or more network interfaces 204A, a non-transitory computer-readable medium drive 206A, and an input/output device interface 208A, all of which may communicate with one another by way of one or more communication buses. The network interface 204A may provide the various services described herein with connectivity to one or more networks or computing systems. The processing unit 202A may thus receive information and instructions from other computing devices, systems, or services via a network. The processing unit 202A may also communicate to and from non-transitory computer-readable medium drive 206A and memory 210A and further provide output information via the input/output device interface 208A. The input/output device interface 208A may also accept input from various input devices, such as a keyboard, mouse, digital pen, touch screen, microphone, camera, etc.

The memory 210A may contain computer program instructions that the processing unit 202A may execute to implement one or more features of the present disclosure. The memory 210A generally includes RAM, ROM and/or other persistent or non-transitory computer-readable storage media. The memory 210A may store an operating system 214A that provides computer program instructions for use by the processing unit 202A in the general administration and operation of the modules and services 216A, including its components. The modules and services 216A are further discussed with respect to FIG. 2B and elsewhere herein. The memory 210A may further include other information for implementing aspects of the present disclosure.

In an example embodiment, the memory 210A includes an interface module 212A. The interface module 212A can be configured to facilitate generating one or more interfaces through which a compatible computing device may send to, or receive from, the modules and services 216A.

Figure 2B:
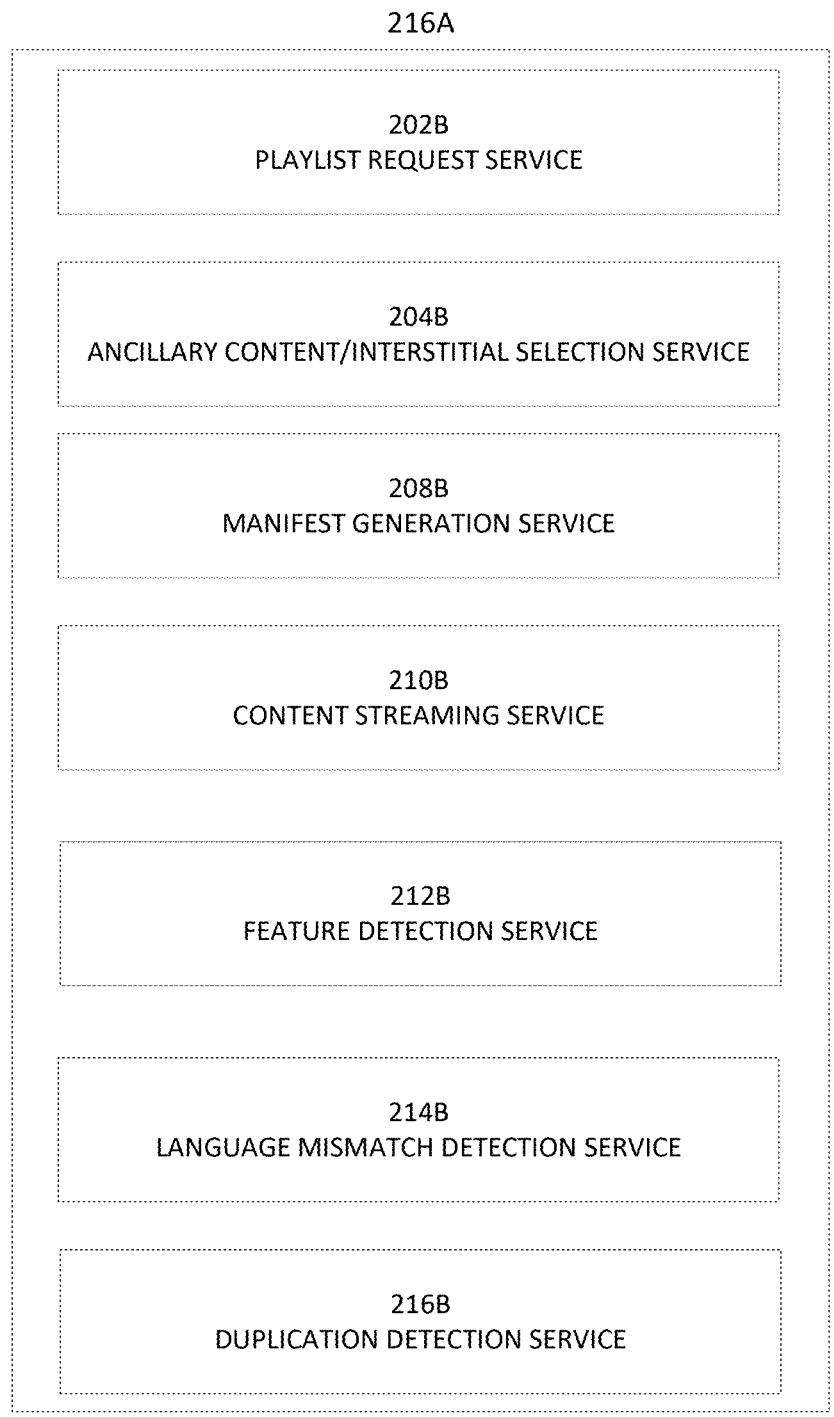
FIG. 2B illustrates example modules and services.

The modules or components described above may also include additional modules or may be implemented by computing devices that may not be depicted in FIGS. 2A and 2B. For example, although the interface module 212A and the modules and services 216A are identified in FIG. 2B as single modules, the modules may be implemented by two or more modules and in a distributed manner. By way of further example, the processing unit 202A may optionally include both a general purpose processor and a video codec. The system 104 may offload certain compute-intensive portions of the modules and services 216A (e.g., transcoding and/or transrating a stream for adaptive bitrate operations, compositing, and/or the like) to one or more dedicated devices, such as a standalone video codec (e.g., H.264 encoders and decoders), while other code may run on a general purpose processor. The system 104 may optionally be configured to support multiple streaming protocols, may provide low latency pass-through, and may support a large number of parallel streams (e.g., HD, 4K, and/or 8K streams).

The processing unit 202A may optionally comprise a graphics processing unit (GPU) that includes hundreds or thousands of core processors configured to process tasks in parallel. The GPU may include high speed memory dedicated for graphics processing tasks. As another example, the system 104 and its components can be implemented by network servers, application servers, database servers, combinations of the same, or the like, configured to facilitate data transmission to and from data stores, user terminals, and third party systems via one or more networks. Accordingly, the depictions of the modules are illustrative in nature.

Referring to FIG. 2B, the modules and services 216A may include modules that provide a playlist request service 202B, an interstitial selection service 204B, a playlist manifest generation service 208B, a content streaming service 210B, a feature detection service 212B, a language mismatch detection service 214B, and a duplication detection service 216B.

The playlist request service 202B may receive and process requests for playlist manifests. The interstitial selection service 204B may assemble context information for a given interstitial pod (e.g., the length of the interstitial pod, the subject matter of requested primary content, information regarding a channel the viewer is watching, the content of a scene in which the interstitial pod is located, etc.) and transmit the information to one or more interstitial source and/or decisioning systems. The interstitial source and/or decisioning systems may propose interstitial content to the interstitial selection service 204B of the stitching system. The interstitial selection service 204B may evaluate the proposals and select one or more items of interstitial content for inclusion in the interstitial pod.

The manifest generation service 208B may be used to assemble a playlist manifest (e.g., an HLS or MPEG DASH manifest) including locators (e.g., URLs) pointing to segments and sections of primary and interstitial content and locators (e.g., URLs), organized to correspond to the desired playback sequence. The manifest may be transmitted to a client on a user device. The client may then request a given item of content (e.g., section or segment) as needed, which may then be served by the corresponding content source or intermediary to the client.

A feature detection service 212B is configured to detect source features (e.g., brand names, logos, source-identifying designs, and/or the like) in a given image (e.g., a frame in an item of video ancillary content) or images (e.g., frames in an item of video ancillary content), and to determine whether the image(s) contain source identifying features (e.g., brand names, brand logos, etc.) of more than one source as similarly discussed elsewhere herein. For example, the feature detection service 212B may include a text identifier engine and a logo detection engine. The feature detection service 212B may optionally be configured to take one or more actions based on the detection that the image(s) include source identifying features of more than one source (e.g., more than one brand). For example, the feature detection service 212B may communicate a detection of multiple brands to an advertiser and/or a demand-side platform that served the ancillary content and may optionally prohibit the ancillary content from being served again.

The feature detection service 212B may also be configured to detect if two or more items of ancillary content (e.g., interstitial content) contains two or more items of ancillary content that have been digitally joined together (e.g., digitally splice together) based on certain detected video and/or audio features. For example, as discussed elsewhere herein, certain visual characteristics (e.g., a black period or more than a threshold difference in brightness) may be detected in one or more selected portions of the video (e.g., about the middle of the video) which may indicate a change from one item of ancillary content to another item of ancillary content as similarly discussed elsewhere herein. By way of illustration, optionally a black screen or frame may be detected in a video by analyzing pixel values in video frames to determine if they fall within a certain or specified range associated with blackness. Optionally, a frame may be converted to grayscale and the average pixel intensity may be calculated. If the average intensity is below a specified threshold, the frame may be considered a black frame.

By way of further example, the amplitude or energy of an audio track of an item of ancillary content may be monitored using an audio analysis engine and a sudden change in volume (e.g., changes in average volume, peak volume, and/or the like exceeding a specified velocity, such as dB/ms) or silence (e.g., a volume less than a threshold loudness level, which may be specified in decibels, for a specified minimum and/or maximum amount of time) during a selected portion of the audio track (e.g., about the middle of the audio track) may be detected (which may indicate a change from one item of ancillary content to another item of ancillary content), optionally for a specified period of time (e.g., 1 to 3 seconds).

A variety of computer vision techniques may be utilized to detect the presence and read of source identifiers (e.g., brand names or logos) in an image, such as in one or more portions of ancillary content (e.g., a first half and a second half of an item of ancillary content), although the different techniques may be used with respective different technical advantages and/or disadvantages. In certain cases it may be beneficial to utilize two or more techniques, such as two or more of the techniques disclosed herein.

Optical Character Recognition (OCR) may be applied to individual frames of a video to detect and recognize text as similarly discussed elsewhere herein. However, using OCR alone may not be efficient for real-time video processing, especially when dealing with large amounts of data. The input image may be preprocessed to enhance its quality and make it suitable for OCR. Preprocessing may include noise removal to reduce or eliminate unwanted elements or artifacts in the image that can interfere with text recognition. Image smoothing performed to reduce irregularities or variations in pixel intensity. Optionally, the image may be normalized and adjusted to a standard size, resolution, or orientation.

Text localization algorithms may be utilized to identify image regions that contain text. The algorithm may detect text boundaries of text areas or lines. Various techniques, such as edge detection or connected component analysis, may be used for text localization. After text regions are identified, the image may be segmented into individual characters or words. Features of the segmented characters, such as shape, size, and texture, may be extracted to represent the information needed for recognition. These features serve as input to the OCR algorithm. Machine learning and/or pattern recognition algorithms may be utilized to match the extracted features with predefined patterns corresponding to characters. For example, a neural network, comprising an input layer, one or more hidden layers, an output layer, one or more pooling years, and an error function may be utilized to match the extracted features with predefined patterns corresponding to characters. An example neural network is described elsewhere herein with reference to FIG. 3A.

Optionally, post-processing may be performed on the recognized characters to improve the accuracy of the OCR results. By way of example, error correction may be performed to correct recognized characters based on context or using a language model. An example of a large language model is discussed herein with reference to FIG. 3B. Dictionary-based correction may be performed, where recognized words are verified against a dictionary to improve accuracy. A confidence level may be assigned to respective recognized characters or words. The final recognized text may be formatted into a structured output, such as a text file, a message, or a document.

Optionally, background subtraction may be utilized to identify text, wherein the foreground is extracted from the background in respective frames. Once the foreground is isolated, text regions can be detected by analyzing the remaining objects. Optionally, edge detection may be employed to identify boundaries between different objects in a video frame. Text regions often have distinct edges, and edge detection may be utilized to locate text regions.

Optionally, connected component analysis may be utilized to identify text, wherein pixels are grouped into connected components based on certain criteria, such as color or intensity. Because text regions are often connected components having similar color or intensity, connected component analysis may be used to identify and extract such text regions.

Optionally, machine learning and deep learning models, such as convolutional neural networks (CNNs) described elsewhere herein, may be trained to detect and recognize text in video frames. Advantageously, such models may be trained to learn complex patterns and variations in text appearance.

Optionally, motion-based techniques may be utilized in performing text recognition. Text often exhibits different motion characteristics compared to the background or other objects in a video. The motion patterns may be analyzed to detect text regions. This technique may be particularly useful when dealing with moving cameras or dynamic scenes.

Once text is detected in a given frame, text tracking algorithms may be employed to follow the text across multiple frames. This can improve the robustness of text detection, particularly in cases where the text may be occluded or undergo deformations.

In addition, computer vision can be used to detect logos in images through a combination of image processing techniques and machine learning methods. One or more images (e.g., one or more frames of ancillary content, such as an ad) may be pre-processed. Images may be resized, wherein input image sizes are standardized to ensure consistency during processing. Image colors may be normalized, where image colors and/or brightness may be adjusted to enhance the visibility of logos. Feature extraction may then be performed.

For example, Scale-Invariant Feature Transform (SIFT) and/or Speeded-Up Robust Features (SURF) may be utilized to extract distinctive features from the image, focusing on key points that are robust to scale and rotation changes. Pre-trained convolutional neural networks (CNNs) may be utilized to automatically extract hierarchical features from the image.

Then, logo detection may be performed. Template matching may optionally be performed, wherein extracted features from the image are compared to predefined templates of logos. This technique advantageously uses relatively less processing power, but may be sensitive to variations in scale, rotation, and lighting.

Optionally, a sliding window and classifiers may be used to detect a logo. Windows of various sizes may be slid across the image and a classifier (e.g., a machine learning model) may be utilized to determine whether the content within the window corresponds to a logo or not. Advantageously, this technique enables the detection of logos at different scales.

Optionally, object detection models may be used to detect a logo. A trained object detection model (e.g., Faster R-CNN, YOLO, SSD) may be utilized that can identify and locate logos within an image.

The logo detector may be trained using a dataset. For example, the dataset may include images containing logos, where bounding boxes or regions where logos are present are annotated. The machine learning model (e.g., a support vector machine (SVM), random forest, a deep learning model, or other model) may be trained using the annotated dataset. For deep learning, transfer learning with a pre-trained model on a large dataset may be utilized.

Post-processing may be performed. For example, non-maximum suppression may optionally be utilized to eliminate or reduce redundant or overlapping bounding boxes, maintaining only the more or most confident predictions (e.g., that have a confidence indicator above a specified threshold).

A language detection mismatch service 214B is configured to determine a mismatch between one item of content (e.g., ancillary content, such as an ad) and another item of related content (e.g., an item of primary content) as similarly discussed elsewhere herein. The detection mismatch service 214B may optionally be configured to take one or more actions based on the detection that the image(s) include source identifying features of more than one source (e.g., more than one brand). For example, the detection mismatch service 214B may communicate a detection of a language mismatch to an advertiser and/or a demand-side platform that served the ancillary content and may prohibit the ancillary content from being served again (e.g., with respect to the item of primary content) to client devices.

As similarly discussed elsewhere herein, a language mismatch may optionally be detected by comparing metadata, indicating the language of the item of primary content, with metadata indicating the language of the item of ancillary content. If the language metadata of the primary content does not match the metadata of the ancillary content, a language mismatch may be flagged. Optionally, a language recognition algorithm may be utilized to analyze the audio tracks of the ancillary content and/or the primary content. The algorithm may assign a code to the language (e.g., an ISO 639 code). The code for the primary content may be compared to the code from the ancillary content. If the codes match, a determination may be made that there is no language mismatch. If the codes do not match, a determination may be made that there is a language mismatch.

Optionally, as similarly discussed elsewhere herein, Natural Language Processing (NLP) may be used to perform language identification by analyzing the audio tracks of the primary and ancillary content. For example, acoustic analysis may be performed analyzing acoustic features of speech signals to determine the language being spoken. Different languages exhibit distinct acoustic characteristics, such as phoneme patterns, intonation, and rhythm. Mel-Frequency Cepstral Coefficients (MFCCs) and/or spectrogram analysis may be utilized to extract relevant features from the audio signal. Phonetic analysis may be performed to analyze phonetic patterns of the audio tracks, and using the analysis determine which language corresponds to the detected phonetic pattern.

A statistical language model and/or machine learning model may be utilized to perform language identification by analyzing the linguistic features of the transcribed content and predicting the most likely language. Keyword spotting may be performed to identify the audio track language, wherein specific words or phrases that are language-specific can be used as cues for language identification. Deep learning models, such as neural networks (e.g., CNNs or RNNs) trained on spectrogram data or other representations of audio signals for language identification, may be utilized to identify the audio track language. Optionally, multiple techniques (e.g., acoustic analysis, phonetic analysis, and/or language models) may be utilized to identify the language used in an audio track.

A duplicate detection service 216B is configured to identify duplicate items of content (e.g., interstitial video content, such as an ad) stored in memory, and to initiate deletion of a given duplicate item of content. For example, a fingerprint of a given video (e.g., an item of interstitial video content) may be generated and compared to other video fingerprints of video content stored in memory. If a matching fingerprint is detected, one of the copies of the item of video content may be deleted to thereby reduce memory utilization and to prevent or reduce the possibility that the item of video content will be inadvertently transmitted multiple times to a given user device.

For example, as similarly discussed elsewhere herein, a video fingerprint may be generated using a feature extraction technique to capture relevant information from video frames. The extracted features may include one or more of color histograms, key frames, and/or other visual descriptors. The fingerprint may also comprise video length. Optionally, video audio track features may be extracted and used to generate the fingerprint. For example, MFCCs or spectrogram representations, rhythm features (e.g., beat information), chroma features representing pitch information, and/or statistical features (e.g., mean, variance, etc.), may be utilized in generating an audio fingerprint. A hashing algorithm or encoding method may optionally be utilized to convert the extracted features into a compact representation.

Optionally, features that are invariant or less sensitive to certain transformations (e.g., resizing or cropping) may be extracted, such as color histograms and/or texture features, as opposed to pixel values (which are more sensitive to such transformations). By way of further example, scale-invariant techniques may be utilized to handle resizing, wherein the scale of the video frames may be normalized. Optionally, spatial and/or temporal consistency checks in the video may be performed, wherein the relationship between adjacent frames is analyzed to detect spatial transformations (e.g., cropping) and temporal transformations (e.g., frame rearrangement). Optionally, error-correcting codes may be utilized to handle variations in the video content. The video fingerprints may be stored in a database along with related metadata such as video ID, duration, and/or other identifying information, for use in the fingerprint comparison operation discussed herein.

Figure 3A:
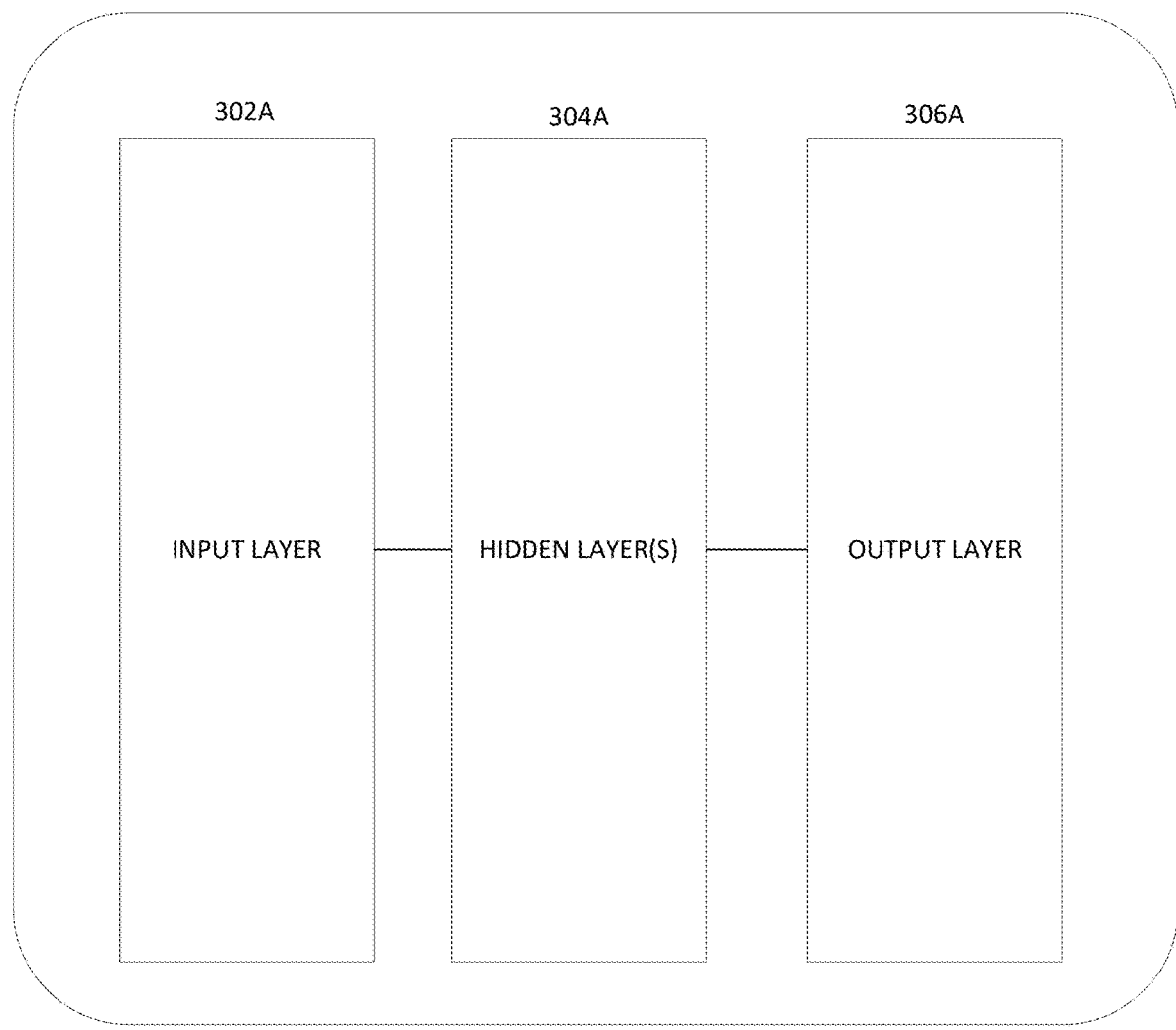
FIGS. 3A-3B illustrate example learning model architectures.

An example of a neural network configured to identify text (e.g., brands) and logos, such as described herein, is illustrated in FIG. 3A. Such a neural network may be utilized with respect to determining if an item of ancillary content includes two separate items of ancillary content joined together as described elsewhere herein. The neural network may also be utilized to determine if a given item of ancillary content includes subject matter that conflicts with or is otherwise inappropriate to be used with an item of primary content, or a portion thereof, as described elsewhere herein.

The neural network may contain an input layer 302A, one or more hidden layers 304A, and an output layer 306A. The hidden layers 304A may be configured as convolutional layers, pooling layers, fully connected layers and/or normalization layers. For example, the neural network may be configured with one or more pooling layers that combine outputs of neuron clusters at one layer into a single neuron in the next layer. Max pooling and/or average pooling may be utilized. Max pooling may utilize the maximum value from each of a cluster of neurons at the prior layer. Average pooling may utilize the average value from each of a cluster of neurons at the prior layer.

Neural network training data may comprise datasets having text or logos (e.g., with annotated bounding boxes). The neural network may be trained based using a supervised or unsupervised process. The neural network layer node weights may be adjusted using backpropagation based on an error function output with respect to the accuracy/relevance of the content generated and/or selected by the neural network, to thereby lower the error.

Optionally, the feature detection service 212B may comprise a large language model (LLM) comprising a transformer architecture that may be used in performing error correction to correct recognized characters, as similarly discussed above. For example, a text detection algorithm or a pre-trained model may be utilized to identify regions of interest (ROIs) containing text in the image. For a given text region, the large language model may be utilized to generate predictions or suggestions for the text content. Optionally, a sliding window or region-based processing may be utilized to extract smaller portions of text which may be input to the language model.

The LLM transformer architecture may utilize self-attention, which enables the model to selectively focus on different parts of the input sequence during the encoding process. The transformer architecture may comprise an encoder and a decoder, connected through one or more multi-head attention and feedforward layers.

The LLM encoder is configured to receive an input sequence and process it using multi-head self-attention, where the input sequence is transformed into a set of query, key, and value vectors. The query, key, and value vectors may be used to compute the attention scores between given positions in the sequence, enabling the model to identify the relevant (e.g., most relevant) portions of the input sequence for respective positions.

The LLM decoder may be configured to receive the encoder output and generate an output sequence. The decoder may also utilize multi-head attention and may be further configured with an additional attention mechanism that enables the decoder to attend to the encoder output and to generate the output sequence using the relevant information from the input sequence. For example, an attention module may repeat its computations several times in parallel, which may be referred to as respective attention heads. Optionally, the attention module splits Query, Key, and Value parameters N-ways and passes each, independently, through a separate attention head.

The transformer architecture may comprise one or more feedforward layers, which apply a linear transformation followed by a non-linear activation function to the output of the attention layers. The feedforward layers facilitate further capture patterns in the input and output sequences.

The transformer may comprise a loss function that measures the difference between the predicted output sequence and the true output sequence during training. The transformer is configured to minimize or reduce the loss function output. Backpropagation may be utilized as part of the minimization process, where the gradients of the loss function with respect to the model parameters are calculated and used to update the model weights (e.g., associated with neural network layers).

Figure 3B:
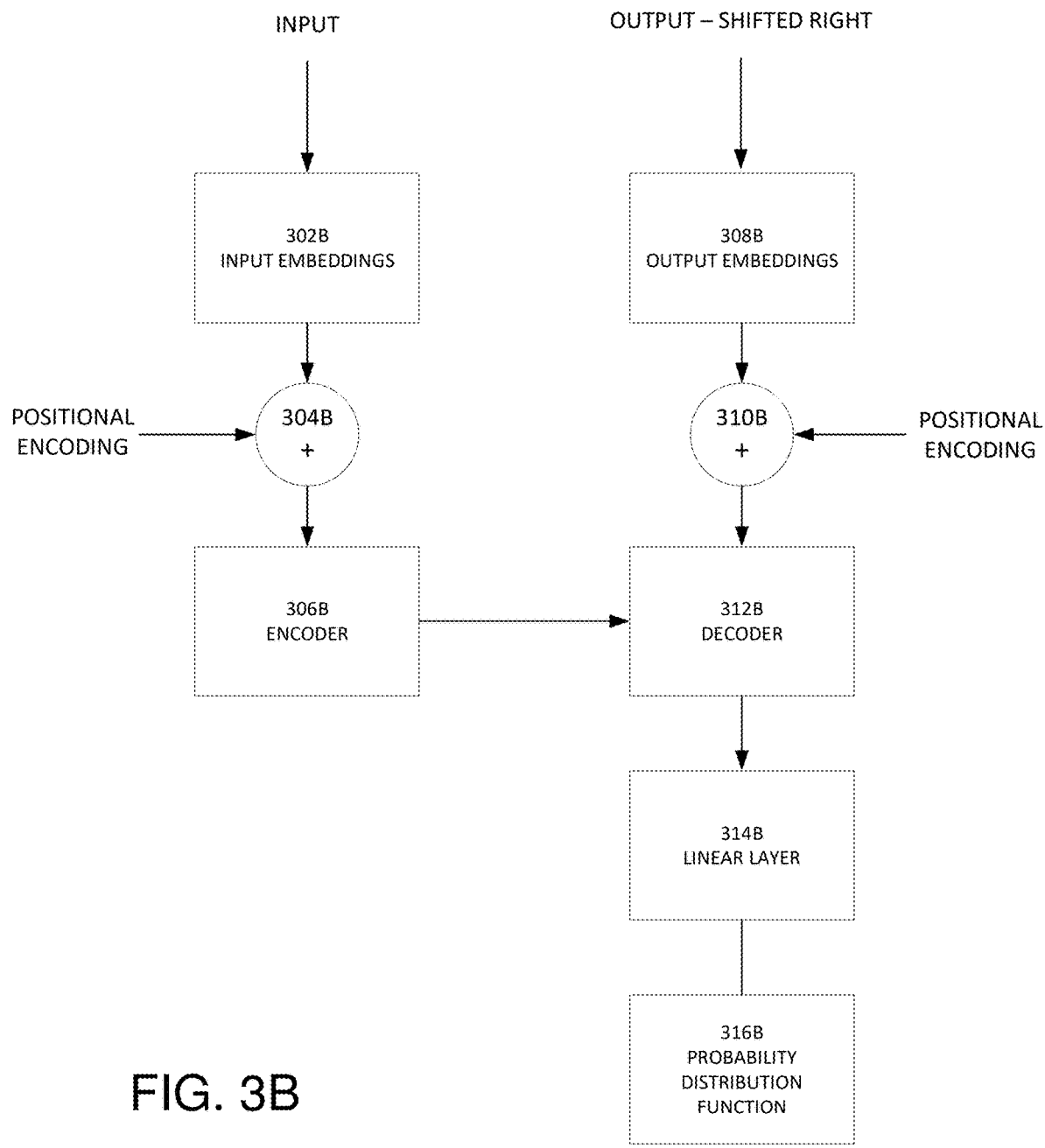

Referring now to FIG. 3B, an example transformer model architecture is illustrated.

Block 302B is configured to receive tokens (a sequence of characters or subwords that represent a single unit of meaning within the input text) and generate input embeddings, where the input text is converted into a numerical format, sometimes referred to as input embeddings. The input embeddings represent words as numbers suitable for machine learning model processing. During training, the model learns how to create such embeddings so that similar vectors represent words with similar meanings.

Positional encoding may be utilized to encode the position of a given word in the input sequence as a set of numbers. The set of numbers may be input to transformer model 304B, in association with the input embeddings, to enable the model to understand the order of words in a sentence and generate grammatically correct and semantically meaningful output.

An optional linear layer 304B (which may optionally comprise a single projection layer) may be trained and configured to translate and align the querying transformer 302B outputs to LLM 306B compatible inputs.

A neural network encoder 306B processes the received text and generates a series of hidden states that encapsulate the text context and the text meaning and that represent the input text at different levels of abstraction. Optionally, there may be a plurality of encoder layers. Optionally, the encoder tokenizes the input text into a sequence of tokens (e.g., words or sub-words), and applies one or more serial attention layers, such as individual words or sub-words. Advantageously, such attention layers enable the transformed model to selectively focus on different parts of the input sequence rather than having to treat each word or sub-word the same way, and further advantageously, enables relationships between inputs significantly distanced apart in the sequence to be determined. Such determined relationships facilitate language processing tasks.

The decoder 312B may be trained to predict a word.

The output is converted to a numerical format, which may be referred to as output embeddings 308B. Positional encoding is optionally performed to facilitate the transformer model understanding of the order of words in a segment (e.g., a sentence). The set of numbers may be input 310B. A loss function, configured to calculate the difference between the transformer model's predictions and the actual values, may be utilized to adjust the transformer model to improve accuracy by reducing the difference between predictions and targets, and hence the error. During training, the output embeddings may compute the loss function and update the transformer model parameters to improve the transformer model performance. During an inference process, the output embeddings may generate output text by mapping the model's predicted probabilities of a given token to the corresponding token in the vocabulary.

The decoder 312B may receive the positionally encoded input representation and the positionally encoded output embeddings and, based on the foregoing, generates an output sequence. There may be one or more layers of decoders 312B. During the training process, the decoder learns how to predict words.

A linear layer 314B may map the output embeddings from the decoder 312B to a higher-dimensional space to thereby transform the output embeddings from the decoder 312B into the original input space. A probability distribution function, 316B, such as the softmax function, may be applied to the output of the model's final layer, producing a vector of scores representing the likelihood of each possible output token in the vocabulary given the input sequence. The function may map these scores to a probability distribution over the vocabulary, with higher scores corresponding to higher probabilities.

By converting the output of the model into a probability distribution, the probability distribution function enables the transformer model to produce a prediction for the next token that is both informed by the input sequence and consistent with the language's syntax and semantics.

Figure 4:
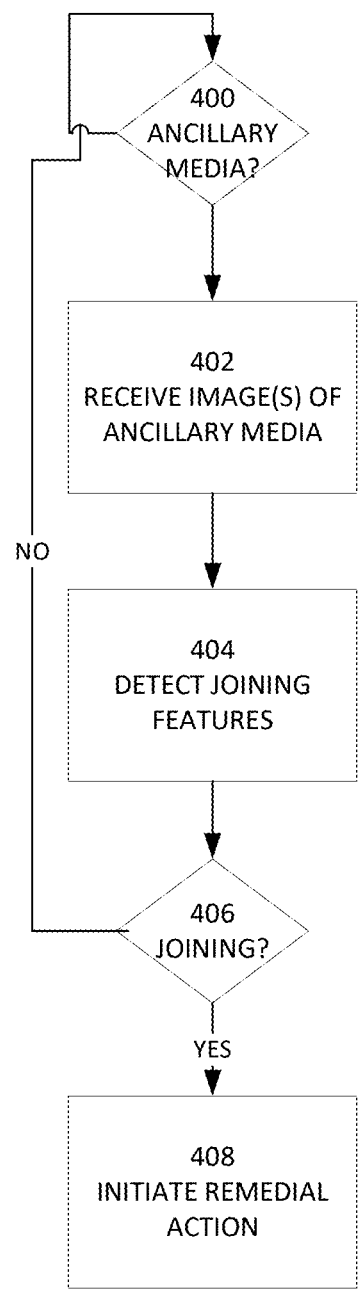
FIG. 4-6 illustrate example processes.

FIG. 4 illustrates an example process of determining that two items of ancillary content have been joined together, wherein a fee for only one item of ancillary content is to be paid. If it is determined that two or more items of ancillary content are joined together, a remediation process may be performed. The process may optionally be implemented using the example systems and components described elsewhere herein (e.g., content composer system 104 and some or all of the components therein).

At block 400, a determination is made as to whether a given item of media content is an item of ancillary content (e.g., an ad comprising a still image or a video), optionally by monitoring a content stream. For example, SCTE-35 markers may be inserted into a content stream. An SCTE-35 marker may be utilized to signal a primary content event or an ancillary content event (e.g., an ad). The SCTE-35 packets may be multiplexed with video and/or audio packets in the transport stream. The SCTE-35 packet may include a splice_info_section that may include a splice_insert to signal a splice event. When an out_of_network_indicator in the splice_info_section is set to 1, it signals switching from a program (primary content) to ancillary content (a cue out event). When the out_of_network_indicator is set to 0, it signals a switch back to the program (a cue in event).

If a determination is made that a given item of media content is an item of ancillary content, at block 402, one or more images (e.g., frames) of the ancillary content may be provided to and received by a feature detection service, such as discussed elsewhere herein.

At block 404, an identification of one or characteristics in the ancillary content may be detected. For example, the process may determine if a certain portion of the ancillary content (e.g., at midway point, such as at 15 seconds plus and/or minus 1-4 seconds) includes a dark or black screen and/or a drop out in sound in the audio track that indicate the joining of two individual items of ancillary content. Optionally, a black screen may be detected in a video by analyzing pixel values in video frames to determine if they fall within a certain range associated with blackness. Optionally, with respect to detecting characteristics in the audio track, the amplitude or energy of an audio track of an item of ancillary content may be monitored and a sudden change in volume (e.g., changes in average volume, peak volume, and/or the like exceeding a specified velocity, such as dB/ms) or silence (e.g., a volume less than a threshold loudness level, which may be specified in decibels) during a selected portion of the audio track (e.g., about the middle of the audio track) may be detected (which may indicate a change from one item of ancillary content to another item of ancillary content).

At block 406, a determination may be made as to whether one or more characteristics (a dark or black screen and/or a drop out in sound in the audio track) have been detected at block 404 at a selected portion (e.g., about the middle) of the ancillary content that indicate that two or more items of ancillary content have been joined.

If a determination is made that one or more characteristics (a dark or black screen and/or a drop out in sound in the audio track) have been detected that indicate that two or more items of ancillary content have been joined, at block 408, a remediation process may be initiated. For example, a message may be generated that indicates that two ads transmitted as a single ad was detected and the message may be transmitted over a network to an advertiser and/or a demand-side platform that served the ancillary content and may be configured to prohibit the ad from being served again.

Figure 5:
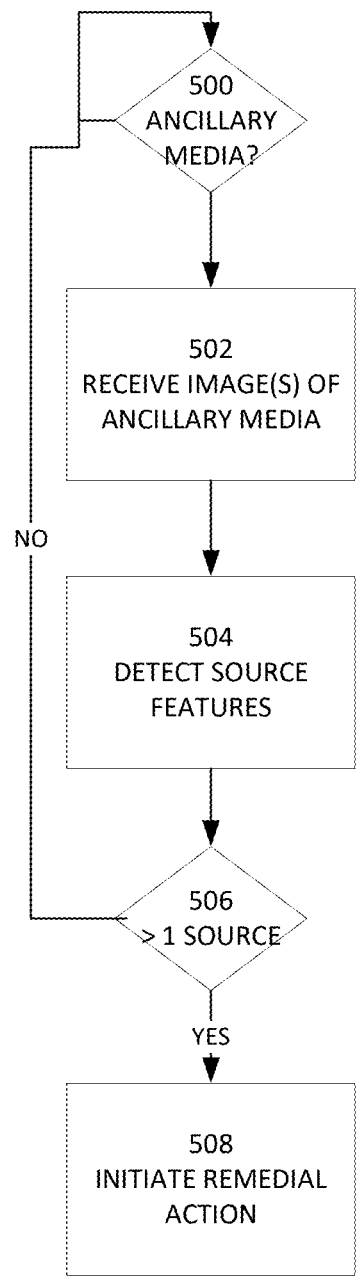

FIG. 5 illustrates an example process of determining and remediating the presence of two or more source identifiers in different portions of an item of ancillary content (e.g., an ad) that indicates the presence of two separate items of ancillary content joined together and transmitted as a single item of ancillary content. The process may optionally be implemented using the example systems and components described elsewhere herein (e.g., content composer system 104 and some or all of the components therein). At block 500, a determination is made as to whether a given item of media content is an item of ancillary content (e.g., an ad comprising a still image or a video) by monitoring a content stream. For example, SCTE-35 markers may be inserted into a content stream. An SCTE-35 marker may be utilized to signal a primary content event or an ancillary content event (e.g., an ad). The SCTE-35 packets may be multiplexed with video and/or audio packets in the transport stream. The SCTE-35 packet may include a splice_info_section that may include a splice_insert to signal a splice event. When an out_of_network_indicator in the splice_info_section is set to 1, it signals switching from a program (primary content) to ancillary content (a cue out event). When the out_of_network_indicator is set to 0, it signals a switch back to the program (a cue in event).

If a determination is made that a given item of media content is an item of ancillary content, at block 502, one or more images (e.g., frames) of the ancillary content may be provided to and received by a feature detection service, such as discussed elsewhere herein.

At block 504, a determination may be made as to whether the ancillary content image(s) include one or more source features, such as textual or graphic source features (e.g., brand names, logos, source identifier designs, and/or the like). For example, the process may determine if there is a first source identifier (associated with a first brand) in a first half of the ancillary content, and if there is a second source identifier (associated with a second brand) in a second half of the ancillary content.

By way of illustration, the determination may be made using the feature detection service comprising a text identifier engine (e.g., configured to perform OCR) and/or a logo detection engine described elsewhere herein. Machine learning and/or pattern recognition algorithms may be utilized to match extracted features with predefined patterns corresponding to characters. For example, with respect to text, a neural network, comprising an input layer, one or more hidden layers, an output layer, one or more pooling years, and an error function may be utilized to match the extracted features with predefined patterns corresponding to characters.

With respect to logos, as similarly discussed elsewhere herein, Scale-Invariant Feature Transform (SIFT) and/or Speeded-Up Robust Features (SURF) may be utilized to extract distinctive features from the image. Pre-trained convolutional neural networks (CNNs) may be utilized to automatically extract hierarchical features from the image. Then, logo detection may be performed. Template matching may optionally be performed, wherein extracted features from the image are compared to predefined templates of logos.

At block 506, a determination may be made, based on examining video frames, source identifiers are contained in different portions of the ancillary content (e.g., a first half of the ancillary content and a second half of the ancillary content) corresponding to more than one source (e.g., more than one brand). For example, if more than two text strings are identified, or more than two graphics/logos are identified, or one item of text and one graphic/logo are identified, in different portions of the ancillary content (e.g., a first half and a second half of the ancillary content), the text and or graphic logos identified at block 506 may be compared to a library of text brand names and graphic logos respectively to determine how many matches there are.

If two or more two source identifiers are identified at different portions of the ancillary content that are associated with respective different sources (e.g., brands), at block 508, a remediation process may be initiated. For example, a message may be generated that identifies the multiple brands detected, and the message may be transmitted over a network to an advertiser and/or a demand-side platform that served the ancillary content and may prohibit the ad from being served again.

Optionally, only the largest text, in height dimensions and/or font size (which may often correspond to a brand name or other source identifier) may be identified and compared to the library of text brand names to determine how many matches there are. By limiting the comparison to the largest text, less computer resources are utilized.

Figure 6:
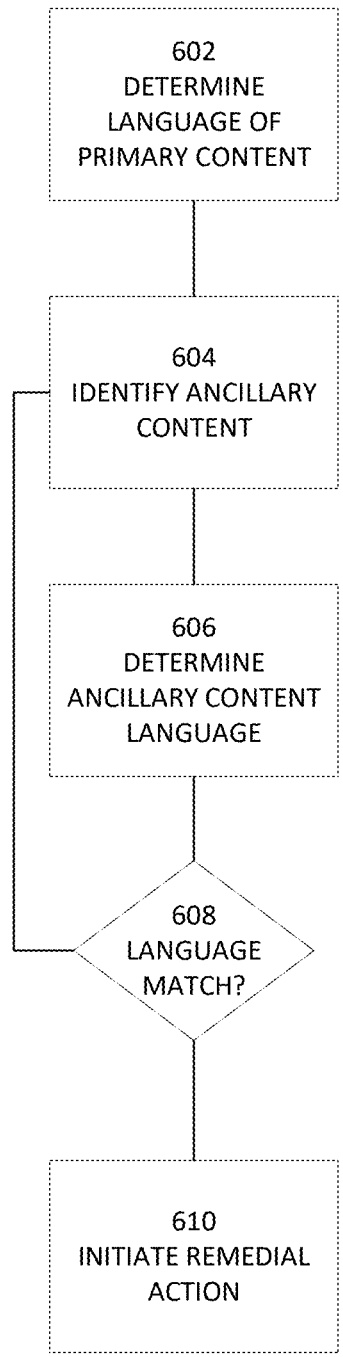

FIG. 6 illustrates an example process for identifying and resolving language mismatches between primary content and ancillary content (e.g., an ad). The process may optionally be implemented using the example systems and components described elsewhere herein (e.g., content composer system 104 and some or all of the components therein).

At block 602, a determination of a language of primary content is made. For example, metadata associated with a given item of primary content may specify the language of the audio track, and such metadata may be read by the process. ISO language codes, such as ISO 639-1 or ISO 639-2 codes, may be used to specify the language of the video. In streaming protocols, such as HLS or DASH, language information may be embedded in the media manifests or playlists that describe how the video is divided into segments for streaming.

At block 604, a determination is made as to whether a given item of media content is an item of ancillary content (e.g., an ad comprising a still image or a video). For example, SCTE-35 markers may be inserted into a content stream. An SCTE-35 marker may be utilized to signal a primary content event or an ancillary content event (e.g., an ad). The SCTE-35 packets may be multiplexed with video and/or audio packets in the transport stream. The SCTE-35 packet may include a splice_info_section that may include a splice_insert to signal a splice event. When an out_of_network_indicator in the splice_info_section is set to 1, it signals switching from a program (primary content) to ancillary content (a cue out event). When the out_of_network_indicator is set to 0, it signals a switch back to the program (a cue in event).

At block 606, language of the audio track of the ancillary content may be determined. For example, the language of the ancillary content may be determined in a manner similar to that of the primary content. For example, metadata associated with a given item of primary content may specify the language of the audio track, and such metadata may be read by the process. ISO language codes, such as ISO 639-1 or ISO 639-2 codes, may be used to specify the language of the video. In the context of streaming advertisements, there may be specific metadata related to ad insertion. This could include information about the language of the advertisement audio track, the targeted audience, and other relevant details.

Certain streaming protocols or advertising standards may use specific tags or markers within the stream to indicate the language of an advertisement.

At block 608, the language of the primary content may be compared to the language of the ancillary content, and a determination may be made whether this is a match or a mismatch. In the event that a language mismatch is determined, at block 610, remedial action may be initiated. For example, a message may be generated that identifies the detected language mismatch and the message may be transmitted over a network to an advertiser and/or a demand-side platform that served the ancillary content and may prohibit the ancillary content from being served again with respect to the item of primary content.

Thus, an aspect of the present disclosure relates to methods and systems configured to analyze streaming video frames and audio tracks being transmitted over a network, such as the Internet, to client devices, and based on such analysis, determine how and if certain data is to be routed.

An aspect of the disclosure is related to methods and systems configured to detect an item of ancillary video content, the item of ancillary video content comprising video frames and an audio track. A first portion of the item of ancillary video content comprising video frames and an audio track. A presence of a first feature in a video frame and/or a second feature within the audio track are detected within the first portion of the item of ancillary video content, wherein the first feature and/or the second features are indicative of a joining of two separate items of ancillary content. At least partly in response to detecting the presence of the first feature in the video frame and/or the second feature, streaming of the first item of ancillary video content to one or more client devices is inhibited.

An aspect of the present disclosure relates to a system, comprising: a computer device; non-transitory computer readable memory having program instructions stored thereon that when executed by the computer device cause the system to perform operations comprising: detecting a streamed first item of ancillary video content configured to be presented in conjunction with primary content, the first item of ancillary video content comprising video frames and an audio track; selecting a first portion having a first time width of the streamed first item of ancillary video content, the first portion comprising a middle portion of the streamed first item of ancillary video content; detecting a presence of a first feature in a video frame and/or a second feature within the audio track within the first portion having the first time width of the streamed first item of ancillary video content, wherein the first feature and/or the second feature are indicative of a joining of two separate items of ancillary content; and at least partly in response to detecting the presence of the first feature in the video frame and/or the second feature within the audio track within the first portion having the first time width of the streamed first item of ancillary video content, inhibiting streaming of the first item of ancillary video content to one or more client devices.

An optional aspect relates to inhibiting the streaming of the first item of ancillary video content to one or more client devices comprising transmitting a message to a source of the first item of ancillary video content An optional aspect relates to, prior to inhibiting the streaming of the first item of ancillary video content to one or more client devices, transmitting the first item of ancillary video content, or a link thereto, to a destination to verify the joining of two separate items of ancillary content. An optional aspect relates to wherein inhibiting the streaming of the first item of ancillary video content to one or more client devices comprises transmitting a signaling message to a decisioning service to reject the first item of ancillary video content. An optional aspect relates to wherein the first feature in the video frame comprises a black frame, the operations further comprising: detecting the black frame by at least: converting the frame to grayscale; and calculating an average pixel intensity of the converted frame; determining if the average intensity is below a first threshold; and at least partly in response to determining the average intensity is below the first threshold, identifying the frame as a black frame. An optional aspect relates to wherein the first feature in the video frame comprises silence, the operations further comprising: detecting an energy or volume level less than a first threshold for at least a first period of time. An optional aspect relates to wherein detecting the presence of the first feature in the video frame and/or the second feature within the audio track further comprises: detecting both the presence of a first feature in the video frame and the second feature within the audio track; assigning a first weight to the detected presence of the first feature in the video frame; assigning a second weight to the detected presence of the second feature within the audio track; and using the detected presence of the first feature in the video frame weighted by the first weight and the detected presence of the detected presence of the second feature within the audio track weighted by the second weight to determine whether the first item of ancillary video content comprises two separate items of ancillary content. An optional aspect relates to identifying text strings in a first portion of a second item of ancillary video content using optical character recognition; determining which of the identified text strings in the first portion of the second item of ancillary video content is largest; determining if the largest identified text string in the first portion of the second item of ancillary video content corresponds to a brand; identifying text strings in a second portion of the second item of ancillary video content using optical character recognition; determining which of the identified text strings in the second portion of the second item of ancillary video content is largest; determining if the largest identified text string in the second portion of the second item of ancillary video content corresponds to a same brand as the largest identified text string in the first portion of the second item of ancillary video content; and at least partly in response to determining that the largest identified text string in the second portion of the second item of ancillary video content corresponds to the same brand as the largest identified text string in the first portion of the second item of ancillary video content, determine that the first item of ancillary video content comprises two separate items of ancillary content. An optional aspect relates to identifying a language being used in an audio track of a second item of ancillary video content using Natural Language Processing (NLP) and/or one or more deep learning models; identifying a language being used in an audio track of a second item of primary content using Natural Language Processing (NLP) and/or one or more deep learning models; determining whether the identified language being used in the audio track of the second item of ancillary video content is a same language as the language identified being used in the second item of primary content; and at least partly in response to determining that the identified language being used in the audio track of the second item of ancillary video content is not the same language as the language identified being used in the second item of primary content, inhibiting the streaming of the second item of ancillary video content to one or more client devices. An optional aspect relates to identifying a language being used in an audio track of a second item of ancillary video content using Natural Language Processing (NLP) and/or a deep learning model; identifying a language being used in closed captioning of the second item of ancillary video content; determining whether the identified language being used in the audio track of the second item of ancillary video content is a same language as the language identified being used in closed captioning of the second item of ancillary video content; and at least partly in response to determining that the identified language being used in the audio track of the second item of ancillary video content is not the same language as the language identified being used in closed captioning of the second item of ancillary video content, inhibiting the streaming of the second item of ancillary video content to one or more client devices.

An aspect of the present disclosure relates to a computer-implemented method, the method comprising: detecting a first item of ancillary video content configured to be presented in conjunction with primary content, the first item of ancillary video content comprising video frames and an audio track; selecting a first portion of the first item of ancillary video content, the first portion comprising a middle portion of the first item of ancillary video content; detecting a presence of a first feature in a video frame and/or a second feature within the audio track within the first portion of the first item of ancillary video content, wherein the first feature and/or the second feature are indicative of a joining of two separate items of ancillary content; and at least partly in response to detecting the presence of the first feature in the video frame and/or the second feature within the audio track within the first portion of the first item of ancillary video content, inhibiting streaming of the first item of ancillary video content to one or more client devices.

An optional aspect relates to wherein inhibiting the streaming of the first item of ancillary video content to one or more client devices comprises transmitting a signaling message to a decisioning service to reject the first item of ancillary video content. An optional aspect relates to wherein the first feature in the video frame comprises a black frame, the method further comprising: detecting the black frame by at least: converting the frame to grayscale; and calculating an average pixel intensity of the converted frame; determining if the average intensity is below a first threshold; and at least partly in response to determining the average intensity is below the first threshold, identifying the frame as a black frame. An optional aspect relates to wherein the first feature in the video frame comprises silence, the method further comprising: detecting an energy or volume level less than a first threshold for at least a first period of time. An optional aspect relates to wherein detecting the presence of the first feature in the video frame and/or the second feature within the audio track further comprises: detecting both the presence of a first feature in the video frame and the second feature within the audio track; assigning a first weight to the detected presence of the first feature in the video frame; assigning a second weight to the detected presence of the second feature within the audio track; and using the detected presence of the first feature in the video frame weighted by the first weight and the detected presence of the detected presence of the second feature within the audio track weighted by the second weight to determine whether the first item of ancillary video content comprises two separate items of ancillary content. An optional aspect relates to identifying text strings in a first portion of a second item of ancillary video content using optical character recognition; determining which of the identified text strings in the first portion of the second item of ancillary video content is largest; determining if the largest identified text string in the first portion of the second item of ancillary video content corresponds to a brand; identifying text strings in a second portion of the second item of ancillary video content using optical character recognition; determining which of the identified text strings in the second portion of the second item of ancillary video content is largest; determining if the largest identified text string in the second portion of the second item of ancillary video content corresponds to a same brand as the largest identified text string in the first portion of the second item of ancillary video content; and at least partly in response to determining that the largest identified text string in the second portion of the second item of ancillary video content corresponds to the same brand as the largest identified text string in the first portion of the second item of ancillary video content, determine that the first item of ancillary video content comprises two separate items of ancillary content. An optional aspect relates to identifying a language being used in an audio track of a second item of ancillary video content using Natural Language Processing (NLP) and/or one or more deep learning models; identifying a language being used in an audio track of a second item of primary content using Natural Language Processing (NLP) and/or one or more deep learning models; determining whether the identified language being used in the audio track of the second item of ancillary video content is a same language as the language identified being used in the second item of primary content; and at least partly in response to determining that the identified language being used in the audio track of the second item of ancillary video content is not the same language as the language identified being used in the second item of primary content, inhibiting the streaming of the second item of ancillary video content to one or more client devices. An optional aspect relates to identifying a language being used in an audio track of a second item of ancillary video content using Natural Language Processing (NLP) and/or a deep learning model; identifying a language being used in closed captioning of the second item of ancillary video content; determining whether the identified language being used in the audio track of the second item of ancillary video content is a same language as the language identified being used in closed captioning of the second item of ancillary video content; and at least partly in response to determining that the identified language being used in the audio track of the second item of ancillary video content is not the same language as the language identified being used in closed captioning of the second item of ancillary video content, inhibiting streaming of the second item of ancillary video content to one or more client devices.

An aspect of the present disclosure relates to non-transitory computer readable memory having program instructions stored thereon that when executed by a computing device cause the computing device to perform operations comprising: detecting a first item of ancillary video content configured to be presented in conjunction with primary content, the first item of ancillary video content comprising video frames and an audio track; selecting a first portion of the first item of ancillary video content; detecting a presence of a first feature in a video frame and/or a second feature within the audio track within the first portion of the first item of ancillary video content, wherein the first feature and/or the second feature are indicative of a joining of two separate items of ancillary content; and at least partly in response to detecting the presence of the first feature in the video frame and/or the second feature within the audio track within the first portion of the first item of ancillary video content, inhibiting streaming of the first item of ancillary video content to one or more client devices.

An optional aspect relates to wherein inhibiting the streaming of the first item of ancillary video content to one or more client devices comprises transmitting a signaling message to a decisioning service to reject the first item of ancillary video content. An optional aspect relates to wherein the first feature in the video frame comprises a black frame, the operations further comprising: detecting the black frame by at least: converting the frame to grayscale; and calculating an average pixel intensity of the converted frame; determining if the average intensity is below a first threshold; and at least partly in response to determining the average intensity is below the first threshold, identifying the frame as a black frame. An optional aspect relates to wherein the first feature in the video frame comprises silence, the operations further comprising: detecting an energy or volume level less than a first threshold for at least a first period of time. An optional aspect relates to wherein detecting the presence of the first feature in the video frame and/or the second feature within the audio track further comprises: detecting both the presence of a first feature in the video frame and the second feature within the audio track; assigning a first weight to the detected presence of the first feature in the video frame; assigning a second weight to the detected presence of the second feature within the audio track; and using the detected presence of the first feature in the video frame weighted by the first weight and the detected presence of the detected presence of the second feature within the audio track weighted by the second weight to determine whether the first item of ancillary video content comprises two separate items of ancillary content. An optional aspect relates to identifying text strings in a first portion of a second item of ancillary video content using optical character recognition; determining which of the identified text strings in the first portion of the second item of ancillary video content is largest; determining if the largest identified text string in the first portion of the second item of ancillary video content corresponds to a brand; identifying text strings in a second portion of the second item of ancillary video content using optical character recognition; determining which of the identified text strings in the second portion of the second item of ancillary video content is largest; determining if the largest identified text string in the second portion of the second item of ancillary video content corresponds to a same brand as the largest identified text string in the first portion of the second item of ancillary video content; and at least partly in response to determining that the largest identified text string in the second portion of the second item of ancillary video content corresponds to the same brand as the largest identified text string in the first portion of the second item of ancillary video content, determine that the first item of ancillary video content comprises two separate items of ancillary content. An optional aspect relates to identifying a language being used in an audio track of a second item of ancillary video content using Natural Language Processing (NLP) and/or one or more deep learning models; identifying a language being used in an audio track of a second item of primary content using Natural Language Processing (NLP) and/or one or more deep learning models; determining whether the identified language being used in the audio track of the second item of ancillary video content is a same language as the language identified being used in the second item of primary content; and at least partly in response to determining that the identified language being used in the audio track of the second item of ancillary video content is not the same language as the language identified being used in the second item of primary content, inhibiting the streaming of the second item of ancillary video content to one or more client devices. An optional aspect relates to identifying a language being used in an audio track of a second item of ancillary video content using Natural Language Processing (NLP) and/or a deep learning model; identifying a language being used in closed captioning of the second item of ancillary video content; determining whether the identified language being used in the audio track of the second item of ancillary video content is a same language as the language identified being used in closed captioning of the second item of ancillary video content; and at least partly in response to determining that the identified language being used in the audio track of the second item of ancillary video content is not the same language as the language identified being used in closed captioning of the second item of ancillary video content, inhibiting the streaming of the second item of ancillary video content to one or more client devices.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc. While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system, comprising:
a computer device;
non-transitory computer readable memory having program instructions stored thereon that when executed by the computer device cause the system to perform operations comprising:
detecting a streamed first item of ancillary video content configured to be presented in conjunction with primary content, the first item of ancillary video content comprising video frames and an audio track;
selecting a first portion having a first time width of the streamed first item of ancillary video content, the first portion comprising a middle portion of the streamed first item of ancillary video content;
detecting a presence of a first feature in a video frame and/or a second feature within the audio track within the first portion having the first time width of the streamed first item of ancillary video content, wherein the first feature and/or the second feature are indicative of a joining of two separate items of ancillary content; and
at least partly in response to detecting the presence of the first feature in the video frame and/or the second feature within the audio track within the first portion having the first time width of the streamed first item of ancillary video content, inhibiting streaming of the first item of ancillary video content to one or more client devices.

2. The system as defined in claim 1, wherein inhibiting the streaming of the first item of ancillary video content to one or more client devices comprises transmitting a signaling message to a decisioning service to reject the first item of ancillary video content.

3. The system as defined in claim 1, wherein inhibiting the streaming of the first item of ancillary video content to one or more client devices comprises transmitting a message to a source of the first item of ancillary video content.

4. The system as defined in claim 1, wherein prior to inhibiting the streaming of the first item of ancillary video content to one or more client devices, the first item of ancillary video content, or a link thereto, is transmitted to a destination to verify the joining of two separate items of ancillary content.

5. The system as defined in claim 1, wherein detecting the presence of the first feature in the video frame and/or the second feature within the audio track, further comprises generating a confidence indication with respect to the presence of the first feature in a video frame and/or the second feature within the audio track, and determining that the first feature is in the video frame and/or the second feature is within the audio track at least partly in response to the confidence indication satisfying a first threshold.

6. The system as defined in claim 1, wherein the first feature in the video frame comprises a black frame, the operations further comprising:
detecting the black frame by at least:
converting the frame to grayscale; and
calculating an average pixel intensity of the converted frame;
determining if the average intensity is below a first threshold; and
at least partly in response to determining the average intensity is below the first threshold, identifying the frame as a black frame.

7. The system as defined in claim 1, wherein the first feature in the video frame comprises silence, the operations further comprising:
detecting an energy or volume level less than a first threshold for at least a first period of time.

8. The system as defined in claim 1, wherein detecting the presence of the first feature in the video frame and/or the second feature within the audio track further comprises:
detecting both the presence of a first feature in the video frame and the second feature within the audio track;
assigning a first weight to the detected presence of the first feature in the video frame;
assigning a second weight to the detected presence of the second feature within the audio track; and
using the detected presence of the first feature in the video frame weighted by the first weight and the detected presence of the detected presence of the second feature within the audio track weighted by the second weight to determine whether the first item of ancillary video content comprises two separate items of ancillary content.

9. The system as defined in claim 1, the operations further comprising:
identifying text strings in a first portion of a second item of ancillary video content using optical character recognition;
determining which of the identified text strings in the first portion of the second item of ancillary video content is largest;
determining if the largest identified text string in the first portion of the second item of ancillary video content corresponds to a brand;
identifying text strings in a second portion of the second item of ancillary video content using optical character recognition;
determining which of the identified text strings in the second portion of the second item of ancillary video content is largest;
determining if the largest identified text string in the second portion of the second item of ancillary video content corresponds to a same brand as the largest identified text string in the first portion of the second item of ancillary video content; and
at least partly in response to determining that the largest identified text string in the second portion of the second item of ancillary video content corresponds to the same brand as the largest identified text string in the first portion of the second item of ancillary video content, determine that the first item of ancillary video content comprises two separate items of ancillary content.

10. The system as defined in claim 1, the operations further comprising:
identifying a language being used in an audio track of a second item of ancillary video content using Natural Language Processing (NLP) and/or one or more deep learning models;
identifying a language being used in an audio track of a second item of primary content using Natural Language Processing (NLP) and/or one or more deep learning models;
determining whether the identified language being used in the audio track of the second item of ancillary video content is a same language as the language identified being used in the second item of primary content; and
at least partly in response to determining that the identified language being used in the audio track of the second item of ancillary video content is not the same language as the language identified being used in the second item of primary content, inhibiting the streaming of the second item of ancillary video content to one or more client devices.

11. The system as defined in claim 1, the operations further comprising:
identifying a language being used in an audio track of a second item of ancillary video content using Natural Language Processing (NLP) and/or a deep learning model;
identifying a language being used in closed captioning of the second item of ancillary video content;
determining whether the identified language being used in the audio track of the second item of ancillary video content is a same language as the language identified being used in closed captioning of the second item of ancillary video content; and
at least partly in response to determining that the identified language being used in the audio track of the second item of ancillary video content is not the same language as the language identified being used in closed captioning of the second item of ancillary video content, inhibiting the streaming of the second item of ancillary video content to one or more client devices.

12. A computer-implemented method, the method comprising:
detecting a first item of ancillary video content configured to be presented in conjunction with primary content, the first item of ancillary video content comprising video frames and an audio track;
selecting a first portion of the first item of ancillary video content, the first portion comprising a middle portion of the first item of ancillary video content;
detecting a presence of a first feature in a video frame and/or a second feature within the audio track within the first portion of the first item of ancillary video content, wherein the first feature and/or the second feature are indicative of a joining of two separate items of ancillary content; and
at least partly in response to detecting the presence of the first feature in the video frame and/or the second feature within the audio track within the first portion of the first item of ancillary video content, inhibiting streaming of the first item of ancillary video content to one or more client devices.

13. The computer-implemented method as defined in claim 12, wherein inhibiting the streaming of the first item of ancillary video content to one or more client devices comprises transmitting a message to a source of the first item of ancillary video content.

14. The computer-implemented method as defined in claim 12, wherein prior to inhibiting the streaming of the first item of ancillary video content to one or more client devices, the first item of ancillary video content, or a link thereto, is transmitted to a destination to verify the joining of two separate items of ancillary content.

15. The computer-implemented method as defined in claim 12, wherein detecting the presence of the first feature in the video frame and/or the second feature within the audio track within the first portion, further comprises generating a confidence indication with respect to the presence of the first feature in a video frame and/or the second feature within the audio track, and determining that the first feature is in the video frame and/or the second feature is within the audio track at least partly in response to the confidence indication satisfying a first threshold.

16. The computer-implemented method as defined in claim 12, wherein inhibiting the streaming of the first item of ancillary video content to one or more client devices comprises transmitting a signaling message to a decisioning service to reject the first item of ancillary video content.

17. The computer-implemented method as defined in claim 12, wherein the first feature in the video frame comprises a black frame, the method further comprising:
detecting the black frame by at least:
converting the frame to grayscale; and
calculating an average pixel intensity of the converted frame;
determining if the average intensity is below a first threshold; and
at least partly in response to determining the average intensity is below the first threshold, identifying the frame as a black frame.

18. The computer-implemented method as defined in claim 12, wherein the first feature in the video frame comprises silence, the method further comprising:
detecting an energy or volume level less than a first threshold for at least a first period of time.

19. The computer-implemented method as defined in claim 12, wherein detecting the presence of the first feature in the video frame and/or the second feature within the audio track further comprises:
detecting both the presence of a first feature in the video frame and the second feature within the audio track;
assigning a first weight to the detected presence of the first feature in the video frame;
assigning a second weight to the detected presence of the second feature within the audio track; and
using the detected presence of the first feature in the video frame weighted by the first weight and the detected presence of the detected presence of the second feature within the audio track weighted by the second weight to determine whether the first item of ancillary video content comprises two separate items of ancillary content.

20. The computer-implemented method as defined in claim 12, the method further comprising:
identifying text strings in a first portion of a second item of ancillary video content using optical character recognition;
determining which of the identified text strings in the first portion of the second item of ancillary video content is largest;
determining if the largest identified text string in the first portion of the second item of ancillary video content corresponds to a brand;
identifying text strings in a second portion of the second item of ancillary video content using optical character recognition;
determining which of the identified text strings in the second portion of the second item of ancillary video content is largest;
determining if the largest identified text string in the second portion of the second item of ancillary video content corresponds to a same brand as the largest identified text string in the first portion of the second item of ancillary video content; and
at least partly in response to determining that the largest identified text string in the second portion of the second item of ancillary video content corresponds to the same brand as the largest identified text string in the first portion of the second item of ancillary video content, determine that the first item of ancillary video content comprises two separate items of ancillary content.

21. The computer-implemented method as defined in claim 12, the method further comprising:
identifying a language being used in an audio track of a second item of ancillary video content using Natural Language Processing (NLP) and/or one or more deep learning models;
identifying a language being used in an audio track of a second item of primary content using Natural Language Processing (NLP) and/or one or more deep learning models;
determining whether the identified language being used in the audio track of the second item of ancillary video content is a same language as the language identified being used in the second item of primary content; and
at least partly in response to determining that the identified language being used in the audio track of the second item of ancillary video content is not the same language as the language identified being used in the second item of primary content, inhibiting the streaming of the second item of ancillary video content to one or more client devices.

22. The computer-implemented method as defined in claim 12, the method further comprising:
identifying a language being used in an audio track of a second item of ancillary video content using Natural Language Processing (NLP) and/or a deep learning model;
identifying a language being used in closed captioning of the second item of ancillary video content;
determining whether the identified language being used in the audio track of the second item of ancillary video content is a same language as the language identified being used in closed captioning of the second item of ancillary video content; and
at least partly in response to determining that the identified language being used in the audio track of the second item of ancillary video content is not the same language as the language identified being used in closed captioning of the second item of ancillary video content, inhibiting streaming of the second item of ancillary video content to one or more client devices.

23. Non-transitory computer readable memory having program instructions stored thereon that when executed by a computing device cause the computing device to perform operations comprising:
detecting a first item of ancillary video content configured to be presented in conjunction with primary content, the first item of ancillary video content comprising video frames and an audio track;
selecting a first portion of the first item of ancillary video content;
detecting a presence of a first feature in a video frame and/or a second feature within the audio track within the first portion of the first item of ancillary video content, wherein the first feature and/or the second feature are indicative of a joining of two separate items of ancillary content; and
at least partly in response to detecting the presence of the first feature in the video frame and/or the second feature within the audio track within the first portion of the first item of ancillary video content, inhibiting streaming of the first item of ancillary video content to one or more client devices.

24. The non-transitory computer readable memory as defined in claim 23, wherein inhibiting the streaming of the first item of ancillary video content to one or more client devices comprises transmitting a message to a source of the first item of ancillary video content.

25. The non-transitory computer readable memory as defined in claim 23, wherein prior to inhibiting the streaming of the first item of ancillary video content to one or more client devices, the first item of ancillary video content, or a link thereto, is transmitted to a destination to verify the joining of two separate items of ancillary content.

26. The non-transitory computer readable memory as defined in claim 23, wherein detecting the presence of the first feature in the video frame and/or the second feature within the audio track within the first portion, further comprises generating a confidence indication with respect to the presence of the first feature in a video frame and/or the second feature within the audio track, and determining that the first feature is in the video frame and/or the second feature is within the audio track at least partly in response to the confidence indication satisfying a first threshold.

27. The non-transitory computer readable memory as defined in claim 23, wherein inhibiting the streaming of the first item of ancillary video content to one or more client devices comprises transmitting a signaling message to a decisioning service to reject the first item of ancillary video content.

28. The non-transitory computer readable memory as defined in claim 23, wherein the first feature in the video frame comprises a black frame, the operations further comprising:
detecting the black frame by at least:
converting the frame to grayscale; and
calculating an average pixel intensity of the converted frame;
determining if the average intensity is below a first threshold; and
at least partly in response to determining the average intensity is below the first threshold, identifying the frame as a black frame.

29. The non-transitory computer readable memory as defined in claim 23, wherein the first feature in the video frame comprises silence, the operations further comprising:
detecting an energy or volume level less than a first threshold for at least a first period of time.

30. The non-transitory computer readable memory as defined in claim 23, wherein detecting the presence of the first feature in the video frame and/or the second feature within the audio track further comprises:
detecting both the presence of a first feature in the video frame and the second feature within the audio track;
assigning a first weight to the detected presence of the first feature in the video frame;
assigning a second weight to the detected presence of the second feature within the audio track; and
using the detected presence of the first feature in the video frame weighted by the first weight and the detected presence of the detected presence of the second feature within the audio track weighted by the second weight to determine whether the first item of ancillary video content comprises two separate items of ancillary content.

31. The non-transitory computer readable memory as defined in claim 23, the operations further comprising:
identifying text strings in a first portion of a second item of ancillary video content using optical character recognition;

determining which of the identified text strings in the first portion of the second item of ancillary video content is largest;

determining if the largest identified text string in the first portion of the second item of ancillary video content corresponds to a brand;

identifying text strings in a second portion of the second item of ancillary video content using optical character recognition;

determining which of the identified text strings in the second portion of the second item of ancillary video content is largest;

determining if the largest identified text string in the second portion of the second item of ancillary video content corresponds to a same brand as the largest identified text string in the first portion of the second item of ancillary video content; and at least partly in response to determining that the largest identified text string in the second portion of the second item of ancillary video content corresponds to the same brand as the largest identified text string in the first portion of the second item of ancillary video content, determine that the first item of ancillary video content comprises two separate items of ancillary content.

32. The non-transitory computer readable memory as defined in claim 23, the operations further comprising:

identifying a language being used in an audio track of a second item of ancillary video content using Natural Language Processing (NLP) and/or one or more deep learning models;

identifying a language being used in an audio track of a second item of primary content using Natural Language Processing (NLP) and/or one or more deep learning models;

determining whether the identified language being used in the audio track of the second item of ancillary video content is a same language as the language identified being used in the second item of primary content; and at least partly in response to determining that the identified language being used in the audio track of the second item of ancillary video content is not the same language as the language identified being used in the second item of primary content, inhibiting the streaming of the second item of ancillary video content to one or more client devices.

33. The non-transitory computer readable memory as defined in claim 23, the operations further comprising:

identifying a language being used in an audio track of a second item of ancillary video content using Natural Language Processing (NLP) and/or a deep learning model;

identifying a language being used in closed captioning of the second item of ancillary video content;

determining whether the identified language being used in the audio track of the second item of ancillary video content is a same language as the language identified being used in closed captioning of the second item of ancillary video content; and at least partly in response to determining that the identified language being used in the audio track of the second item of ancillary video content is not the same language as the language identified being used in closed captioning of the second item of ancillary video content, inhibiting the streaming of the second item of ancillary video content to one or more client devices.

\* \* \* \* \*